United States Patent [19]

Suga et al.

[11] Patent Number: 5,308,811
[45] Date of Patent: May 3, 1994

[54] CATALYST FOR POLYMERIZING AN OLEFIN AND METHOD FOR PRODUCING AN OLEFIN POLYMER

[75] Inventors: Yoshinori Suga, Machida; Yasuo Maruyama, Tokyo; Eiji Isobe, Kawasaki; Toru Suzuki; Fumihiko Shimizu, both of Yokohama, all of Japan

[73] Assignee: Mitsubishi Kasei Corporation, Tokyo, Japan

[21] Appl. No.: 877,112

[22] Filed: May 1, 1992

[30] Foreign Application Priority Data

May 1, 1991 [JP] Japan .................................. 3-100066
Feb. 27, 1992 [JP] Japan .................................. 4-041453

[51] Int. Cl.$^5$ ........................ C08F 4/648; C08F 4/68; C08F 4/69
[52] U.S. Cl. ........................ 502/62; 502/103; 502/117; 502/118; 502/132; 502/108; 526/129
[58] Field of Search .............. 502/62, 103, 117, 118, 502/132, 108

[56] References Cited

U.S. PATENT DOCUMENTS

| 4,808,561 | 2/1989 | Welborn | 502/117 |
| 4,931,517 | 6/1990 | Fujita | 502/117 X |
| 5,017,665 | 5/1991 | Chang |  |

FOREIGN PATENT DOCUMENTS

| 0069951 | 1/1983 | European Pat. Off. . |
| 0206794 | 12/1986 | European Pat. Off. . |
| 0367503 | 5/1990 | European Pat. Off. . |
| 0374619 | 6/1990 | European Pat. Off. . |
| 1395829 | 3/1965 | France . |
| 63-312303 | 12/1988 | Japan . |
| WO89/02453 | 3/1989 | PCT Int'l Appl. . |
| 2032441 | 5/1980 | United Kingdom . |

OTHER PUBLICATIONS

Chemical Abstract, vol. 116, No. 14, AN-129705b.
Chemical Abstract, vol. 113, No. 16, AN-133061u.

Primary Examiner—Patrick P. Garvin
Attorney, Agent, or Firm—Oblon, Spivak, McClelland, Maier & Neustadt

[57] ABSTRACT

A catalyst for polymerizing an olefin which consists essentially of a product obtained by contacting (A) a metallocene-type transition metal compound, (B) at least one member selected from the group consisting of clay, clay minerals, ion exchanging layered compounds, diatomaceous earth, silicates and zeolites, and (C) an organic aluminum compound.

21 Claims, No Drawings

CATALYST FOR POLYMERIZING AN OLEFIN AND METHOD FOR PRODUCING AN OLEFIN POLYMER

FIELD OF THE INVENTION

The present invention relates to a catalyst for polymerizing an olefin and a method for producing an olefin polymer in good yield by means of the catalyst.

BACKGROUND OF THE INVENTION

For the production of an olefin polymer by polymerizing an olefin in the presence of a catalyst, a method has been proposed wherein a catalyst comprising (1) metallocene and (2) aluminoxane is employed (Japanese Unexamined Patent Publications No. 019309/1983 and No. 167307/1990). According to the polymerization method using such a catalyst, the polymerization activities per transition metal are very high as compared with a method of using a conventional Ziegler-Natta catalyst comprising a titanium compound or a vanadium compound and an organic aluminum compound, and it is thereby possible to obtain a polymer having a narrow molecular weight distribution. However, in order to obtain adequate polymerization activities by means of such a catalyst, a large amount of aluminoxane is required, and the polymerization activities per aluminum are low, such being uneconomical. Besides, it is necessary to remove the catalyst residue from the formed polymer.

On the other hand, a method has been proposed wherein polymerization of an olefin is conducted by means of a catalyst having one or both of the above transition metal compound and the aluminoxane carried on an inorganic oxide such as silica or alumina (Japanese Unexamined Patent Publications Nos. 108610/1986, 135408/1985, 296008/1986, 74412/1991 and No. 74415/1991).

Further, a method has been proposed wherein polymerization of an olefin is conducted by means of a catalyst having one or both of the above transition metal compound and an organic aluminum compound carried on an inorganic oxide such as silica or alumina or on an organic material (Japanese Unexamined Patent Publications Nos. 101303/1989, 207303/1989, 234709/1991 and 234710/1991 and Japanese PCT Publication No. 501869/1991).

However, by these methods, the polymerization activities per aluminum are still inadequate, and the amount of the catalyst residue in the product is not negligible.

SUMMARY OF THE INVENTION

The present inventors have conducted extensive studies to solve the above problems, and as a result, have found that a product obtained by contacting a metallocene-type transition metal compound and an organic aluminum compound on a certain specific carrier, exhibits adequately high polymerization activities per transition metal and per aluminum. The present invention has been accomplished on the basis of this discovery.

Thus, the present invention provides a catalyst for polymerizing an olefin which consists essentially of a product obtained by contacting (A) a metallocene-type transition metal compound, (B) at least one member selected from the group consisting of clay, clay minerals, ion exchanging layered compounds, diatomaceous earth, silicates and zeolites, and (C) an organic aluminum compound.

Further, the present invention provides a method for producing an olefin polymer, which comprises homopolymerizing or copolymerizing an olefin in the presence of a catalyst consisting essentially of a product obtained by contacting (A) a metallocene-type transition metal compound, (B) at least one member selected from the group consisting of clay, clay minerals, ion exchanging layered compounds, diatomaceous earth, silicates and zeolites, and (C) an organic aluminum compound, and, if necessary, (D) an organic aluminum compound.

Detailed Description of the Invention

Now, the present invention will be described in detail with reference to the preferred embodiments.

The metallocene-type transition metal compound of component (A) to be used in the catalyst of the present invention, is an organometallic compound composed of a cyclopentadienyl-type ligand which may be substituted, i.e. a cyclopentadienyl ring-containing ligand wherein substituents may bond to form a ring, and a transition metal of Group 4, 5 or 6 of the long-form Periodic Table.

Preferred as such a metallocene-type transition metal compound is a compound of the following formula (1) or (2):

$$R^1{}_m(CpR^2{}_n)(CpR^2{}_n)MR^3{}_2 \qquad (1)$$

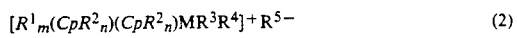

$$[R^1{}_m(CpR^2{}_n)(CpR^2{}_n)MR^3R^4]^+ R^5{}^- \qquad (2)$$

wherein each of $(CpR^2{}_n)$ which may be the same or different, is a cyclopentadienyl group or a substituted cyclopentadienyl group, $R^1$ is a covalent bond crosslinking group containing an element of Group 14 of the long-form Periodic Table such as carbon, silicon or germanium, each of $R^2$ which may be the same or different, is hydrogen, halogen, a silicon-containing group, a $C_{1-20}$ hydrocarbon group which may have a halogen substituent, an alkoxy group or an aryloxy group, provided that when two $R^2$ are located on two adjacent carbon atoms on the cyclopentadienyl group, they may bond to each other to form a $C_{4-6}$ ring, each of $R^3$ which may be the same or different, is hydrogen, halogen, a silicon-containing group, a $C_{1-20}$ hydrocarbon group which may have a halogen substituent, an alkoxy group or an aryloxy group, m is 0 or 1, each n is an integer satisfying $m+n=5$, M is a metal of Group 4, 5 or 6 of the long-form Periodic Table, $R^4$ is a neutral ligand coordinated to M, and $R^5{}^-$ is a counter anion capable of stabilizing said metal cation.

In the formula (1) or (2), $R^1$ is a covalent bond crosslinking group containing an element of Group 14 of the long-form Periodic Table such as carbon, silicon or germanium, and it links two cyclopentadienyl ring-containing groups of the formula $CpR^2{}_n$.

Specifically, it may be an alkylene group such as a methylene group or an ethylene group, an alkylidene group such as an ethylidene group, a propylidene group, an isopropylidene group, a phenyl methylidene group or a diphenylmethylidene group, a silicon-containing crosslinking group such as a dimethylsilylene group, diethylsilylene group, a dipropylsilylene group, a diisopropylsilylene group, a diphenylsilylene group, a methylethylsilylene group, a methylphenylsilylene group, a methylisopropylsilylene group or a methyl-t- butylsilylene group, a germanium-containing crosslinking group such as a dimethyl germilene group, a diethylgermilene group, a dipropylgermilene group, a diisopropylgermilene group, a diphenylgermilene group, a methylethylgermilene group, a methylphenylgermilene group, a methylisopropylgermilene group or a methyl-t-butylgermilene group, an alkylphosphine, or an amine. Among them, an alkylene group, an alkylidene group and a silicon-containing crosslinking group are particularly preferred.

Each of $CpR^2_n$ which may be the same or different, is a cyclopentadietnyl group or a substituted cyclopentadietnyl group. Here, each of $R^2$ which may be the same or different, is hydrogen, halogen such as fluorine, chlorine, bromine or iodine, a silicon-containing group such as trimethylsilyl, triethylsilyl or triphenylsilyl, a $C_{1-20}$ hydrocarbon group which may have a halogen group, such as methyl, ethyl, propyl, butyl, isobutyl, pentyl, isopentyl, hexyl, heptyl, octyl, nonyl, decyl, phenyl, chloromethyl or chloroethyl, an alkoxy group such as methoxy, ethoxy, propoxy or butoxy, or an aryloxygroup such as phenoxy, methylphenoxy or pentamethylphenoxy.

Here, when two $R^2$ are located on two adjacent carbon atoms on the cyclopentadienyl ring, they may bond to each other to form a $C_{4-6}$ ring, such as indenyl, tetrahydroindenyl, fluorenyl or octahydrofluorenyl.

Among them, particularly preferred as $R^2$ are hydrogen, a methyl group and a hydrocarbon group wherein two $R^2$ bond to each other to form indenyl, tetrahydroindenyl, fluorenyl or octahydrofluorenyl.

Each of $R^3$ which may be the same or different, is hydrogen, halogen such as fluorine, chlorine, bromine or iodine, a silicon-containing group such as trimethylsilyl, triethylsilyl or triphenylsilyl, a $C_{1-20}$ hydrocarbon group which may have a halogen substituent, such as methyl, ethyl, propyl, butyl, isobutyl, pentyl, isopentyl, hexyl, heptyl, octyl, nonyl, decyl, phenyl, chloromethyl or chloroethyl, an alkoxy group such as methoxy, ethoxy, propoxy or butoxy, or an aryloxy group such as phenoxy, methylphenoxy or pentamethylphenoxy. Particularly preferred are hydrogen, chlorine and a methyl group.

m is 0 when two cyclopentadienyl rings are not bonded by $R^1$ and 1 when bonded. Each n is 4 when m is 1 and 5 when m is 0.

M is a metal of Group 4, 5 or 6 of the long-form Periodic Table, such as titanium, zirconium, hafnium, vanadium, niobium, tantalum, chromium, molybdenum or tungsten. Particularly preferred is titanium, zirconium or hafnium.

$R^4$ is a neutral ligand coordinated to M, such as tetrahydrofuran. $R^{5-}$ is a counter anion which is capable of stabilizing the metal cation in the above formula (2), such as tetraphenyl borate, tetra(p-tolyl) borate, carbadodeca borate or dicarbaundeca borate. The catalyst of the present invention is capable of producing any one of an isotactic polymer, a syndiotactic polymer and an atactic polymer.

Taking zirconium as an example, specific examples of the above metallocene-type transition metal compound corresponding to the formula (1) include bis(methylcyclopentadienyl)zirconium dichloride,
bis(ethylcyclopentadienyl)zirconium dichloride,
bis(methylcyclopentadienyl)zirconium dimethyl,
bis(ethylcyclopentadienyl)zirconium dimethyl,
bis(methylcyclopentadienyl)zirconium dihydride,
bis(ethylcyclopentadienyl)zirconium dihydride,
bis(dimethylcyclopentadienyl)zirconium dichloride,
bis(trimethylcyclopentadienyl)zirconium dichloride,
bis(tetramethylcyclopentadienyl)zirconium dichloride,
bis(ethyltetramethylcyclopentadienyl)zirconium dichloride, bis(indenyl)zirconium dichloride,
bis(dimethylcyclopentadienyl)zirconium dimethyl,
bis(trimethylcyclopentadienyl)zirconium dimethyl,
bis(tetramethylcyclopentadienyl)zirconium dimethyl,
bis(ethyltetramethylcyclopentadienyl)zirconium dimethyl,
bis(indenyl)zirconium dimethyl,
bis(dimethylcyclopentadienyl)zirconium dihydride,
bis(trimethylcyclopentadienyl)zirconium dihydride,
bis(ethyltetramethylcyclopentadienyl)zirconium dihydride,
bis(trimethylsilylcyclopentadienyl)zirconium dimethyl,
bis(trimethylsilylcyclopentadienyl) zirconium dihydride,
bis(trifluoromethylcyclopentadienyl)zirconium dichloride,
bis(trifluoromethylcyclopentadienyl)zirconium dimethyl,
bis(trifluoromethylcyclopentadienyl)zirconium dihydride,
isopropylidene-bis(indenyl)zirconium dichloride,
isopropylidene-bis(indenyl)zirconium dimethyl,
isopropylidene-bis(indenyl)zirconium dihydride,
pentamethylcyclopentadienyl(cyclopentadienyl)zirconium dichloride,
pentamethylcyclopentadienyl(cyclopentadienyl)zirconium dimethyl,
pentamethylcyclopentadienyl(cyclopentadienyl)zirconium dihydride,
ethyltetramethylcyclopentadienyl(cyclopentadienyl)zirconiumdihydride,
isopropylidene(cyclopentadienyl)(fluorenyl)zirconium dichloride,
isopropylidene(cyclopentadienyl)(fluorenyl)zirconium dimethyl,
dimethylsilyl(cyclopentadienyl)(fluorenyl)zirconium dimethyl,
isoproplylidene(cyclopentadienyl)(fluorenyl)zirconium dihydride, bis(cyclopentadienyl)zirconium dichloride,
bis(cyclopentadienyl)zirconium dimethyl,
bis(cyclopentadienyl)zirconium diethyl,
bis(cyclopentadienyl)zirconium dipropyl,
bis(cyclopentadienyl)zirconium diphenyl,
methylcyclopentadienyl(cyclopentadienyl)zirconium dichloride,
ethylcyclopentadienyl(cyclopentadienyl)zirconium dichloride,
methylcyclopentadienyl(cyclopentadienyl)zirconium dimethyl,
ethylcyclopentadienyl(cyclopentadienyl)zirconium dimethyl,
methylcyclopentadienyl(cyclopentadienyl)zirconium dihydride,
ethylcyclopentadienyl(cyclopentadienyl)zirconium dihydride,
dimethylcyclopentadienyl(cyclopentadienyl)zirconium dichloride,
trimethylcyclopentadienyl(cyclopentadienyl)zirconium dichloride,
tetramethylcyclopentadienyl(cyclopentadienyl)zirconium dichloride, bis(pentamethylcyclopentadienyl)zirconium dichloride, tetramethylcyclopentadienyl(cyclopentadienyl)zirconium dichloride, indenyl(cyclopentadienyl)zirconium dichloride,
dimethylcyclopentadienyl(cyclopentadienyl)zirconium dimethyl,
trimethylcyclopentadienyl(cyclopentadienyl)zirconium dimethyl,
tetramethylcyclopentadienyl(cyclopentadienyl)zirconium dimethyl, bis(pentamethylcyclopentadienyl)zirconium dimethyl,
ethyltetramethylcyclopentadienyl(cyclopentadienyl)zirconium dimethyl, indenyl(cyclopentadienyl)zirconium dimethyl,
dimethylcyclopentadienyl(cyclopentadienyl)zirconium dihydride,
trimethylcyclopentadienyl(cyclopentadienyl)zirconium dihydride, bis(pentamethylcyclopentadienyl)zirconium dihydride, indenyl(cyclopentadienyl)zirconium dihydride,
trimethylsilylcyclopentadienyl(cyclopentadienyl)zirconium dimethyl,
trimethylsilylcyclopentadienyl(cyclopentadienyl)zirconium dihydride,
trifluoromethylcyclopentadienyl(cyclopentadienyl)zirconium dichloride,
trifluoromethylcyclopentadienyl(cyclopentadienyl)zirconium dimethyl,
trifluoromethylcyclopentadienyl(cyclopentadienyl)zirconium dihydride,
bis(cyclopentadienyl)(trimethylsilyl)(methyl)zirconium,
bis(cyclopentadienyl)(triphenylsilyl)(methyl)zirconium,
bis(cyclopentadienyl)[tris(dimethylsilyl)silyl](methyl)zirconium,
bis(cyclopentadienyl)[bis(methylsilyl)silyl](methyl)-zirconium,
bis(cyclopentadienyl)(trimethylsilyl)(trimethylsilyl methyl)zirconium,
bis(cyclopentadienyl)(trimethylsilyl)(benzyl)zirconium, methylene-bis(cyclopentadienyl)zirconium dichloride,
ethylene-bis(cyclopentadienyl)zirconium dichloride,
isopropylidene-bis(cyclopentadienyl)zirconium dichloride,
dimethylsilyl-bis(cyclopentadienyl)zirconium dichloride,
methylene-bis(cyclopentadienyl)zirconium dimethyl,
ethylene-bis(cyclopentadienyl)zirconium dimethyl,
isopropylidene-bis(cyclopentadienyl)zirconium dimethyl,
dimethylsilyl-bis(cyclopentadienyl)zirconium dimethyl,
methylene-bis(cyclopentadienyl)zirconium dihydride,
ethylene-bis(cyclopentadienyl)zirconium dihydride,
isopropylidene-bis(cyclopentadienyl)zirconium dihydride and
dimethylsilyl-bis(cyclopentadienyl)zirconium dihydride.

Further, those corresponding to the formula (2) include a
bis(methylcyclopentadienyl)zirconium(chloride)(tetraphenylborate)tetrahydrofuran complex, a
bis(ethylcyclopentadienyl)zirconium(chloride)(tetraphenylborate)tetrahydrofuran complex, a
bis(methylcyclopentadienyl)zirconium(methyl)(tetraphenylborate)tetrahydrofuran complex, a
bis(ethylcyclopentadienyl)zirconium(methyl)tetraphenylborate)tetrahydrofuran complex, a
bis(methylcyclopentadienyl)zirconium(hydride)(tetraphenylborate)tetrahydrofuran complex, a
bis(ethylcyclopentadienyl)zirconium(hydride)(tetraphenylborate)tetrahydrofuran complex, a
bis(dimethylcyclopentadienyl)zirconium(chloride)(tetraphenylborate)tetrahydrofuran complex, a
bis(trimethylcyclopentadienyl)zirconium(chloride)(tetraphenylborate)tetrahydrofuran complex, a
bis(tetramethylcyclopentadienyl)zirconium(chloride)(tetraphenylborate)tetrahydrofuran complex, a
bis(ethyltetramethylcyclopentadienyl)zirconium(chloride)(tetraphenylborate)tetrahydrofuran complex, a
bis(indenyl)zirconium(chloride)(tetraphenylborate)tetrahydrofuran complex, a
bis(dimethylcyclopentadienyl)zirconium(methyl)(tetraphenylborate)tetrahydrofuran complex, a
bis(trimethylcyclopentadienyl)zirconium(methyl)(tetraphenylborate)tetrahydrofuran complex, a
bis(tetramethylcyclopentadienyl)zirconium(methyl)-(tetraphenylborate)tetrahydrofuran complex, a
bis(ethyltetramethylcyclopentadienyl)zirconium(methyl)tetraphenylborate)tetrahydrofuran complex, a
bis(indenyl)zirconium(methyl)(tetraphenylborate)tetrahydrofuran complex, a
bis(dimethylcyclopentadienyl)zirconium(hydride)(tetraphenylborate)tetrahydrofuran complex, a
bis(trimethylcyclopentadienyl)zirconium(hydride)(tetraphenylborate)tetrahydrofuran complex, a
bis(ethyltetramethylcyclopentadienyl)zirconium(hydride)(tetraphenylborate)tetrahydrofuran complex, a
bis(trimethylsilylcyclopentadienyl)zirconium(methyl)-(tetraphenylborate)tetrahydrofuran complex, a
bis(trimethylsilylcyclopentadienyl)zirconium(hydride)(tetraphenylborate)tetrahydrofuran complex, a
bis(trifluoromethylcyclopentadienyl)zirconium(methyl)(tetraphenylborate)tetrahydrofuran complex, a
bis(trifluoromethylcyclopentadienyl)zirconium(hydride)(tetraphenylborate)tetrahydrofuran complex, an
isopropylidene-bis(indenyl)zirconium(chloride)(tetraphenylborate)tetrahydrofuran complex, an
isopropylidene-bis(indenyl)zirconium(methyl)(tetraphenylborate)tetrahydrofuran complex, an
isopropylidene-bis(indenyl)zirconium(hydride)(tetraphenylborate)tetrahydrofuran complex, a
pentamethylcyclopentadienyl(cyclopentadienyl)zirconium (chloride)(tetraphenylborate)tetrahydrofuran complex, an
ethyltetramethylcyclopentadienyl(cyclopentadienyl)zirconium(chloride)(tetraphenylborate)tetrahydrofuran complex, a
pentamethylcyclopentadienyl(cyclopentadienyl)zirocnium(methyl)(tetraphenylborate)tetrahydrofuran complex, an
ethyltetramethylcyclopentadienyl(cyclopentadienyl)zirconium(methyl)(tetraphenylborate)tetrahydrofuran complex, a
pentamethylcyclopentadienyl(cyclopentadienyl)zirconium(hydride)(tetraphenylborate)tetrahydrofuran complex, an
ethyltetramethylcyclopentadienyl(cyclopentadienyl)zirconium(hydride)(tetraphenylborate)tetrahydrofuran complex, an
isopropylidene(cyclopentadienyl)(fluorenyl)zirconium(chloride)(tetraphenylborate)tetrahydrofuran complex, an isopropylidene(cyclopentadienyl)(fluorenyl)zirconium(methyl)(tetraphenylborate)tetrahydrofuran complex, an
isopropylidene(cyclopentadienyl)(fluorenyl)zirconium(hydride)(tetraphenylborate)tetrahydrofuran complex, a
bis(cyclopentadienyl)zirconium(chloride)(tetraphenylborate)tetrahydrofuran complex, a
bis(cyclopentadienyl)(methyl)zirconium(tetraphenylborate)tetrahydrofuran complex, a
bis(cyclopentadienyl)(ethyl)zirconium(tetraphenylborate)tetrahydrofuran complex, a
bis(cyclopentadienyl)(propyl)zirconium(tetraphenylborate)tetrahydrofuran complex, a
bis(cyclopentadienyl) (phenyl)zirconium(tetraphenylborate)tetrahydrofuran complex, a
methylcyclopentadienyl(cyclopentadienyl)zirconium(chloride)(tetraphenylborate)tetrahydrofuran complex, an
ethylcyclopentadienyl(cyclopentadienyl)zirconiumchloride(tetraphenylborate)tetrahydrofuran complex, a
bis(ethylcyclopentadienyl)zirconium(chloride)(tetraphenylborate)tetrahydrofuran complex, a
methylcyclopentadienyl(cyclopentadienyl)zirconium(methyl)(tetraphenylborate)tetrahydrofuran complex, an
ethylcyclopentadienyl(cyclopentadienyl)zirconium(methyl)(tetraphenylborate)tetrahydrofuran complex, a
methylcyclopentadienyl(cyclopentadienyl)zirconium(hydride)(tetraphenylborate)tetrahydrofuran complex, an
ethylcyclopentadienyl(cyclopentadienyl)zirconium(hydride)(tetraphenylborate)tetrahydrofuran complex, a
dimethylcyclopentadienyl(cyclopentadienyl)zirconium(chloride)(tetraphenylborate)tetrahydrofuran complex, a
trimethylcyclopentadienyl(cyclopentadienyl)zirconium(chloride)(tetraphenylborate)tetrahydrofuran complex, a
tetramethylcyclopentadienyl(cyclopentadienyl)zirconium(chloride)(tetraphenylborate)tetrahydrofuran complex, a
bis(pentamethylcyclopentadienyl)zirconium(chloride)(tetraphenylborate)tetrahydrofuran complex, an
indenyl(cyclopentadienyl)zirconium(chloride)(tetraphenylborate)tetrahydrofuran complex, a
dimethylcyclopentadienyl(cyclopentadienyl)zirconium(methyl)(tetraphenylborate)tetrahydrofuran complex, a
trimethylcyclopentadienyl(cyclopentadienyl)zirconium(methyl)(tetraphenylborate)tetrahydrofuran complex, a
tetramethylcyclopentadienyl(cyclopentadienyl)zirconium(methyl)(tetraphenylborate)tetrahydrofuran complex, a
bis(pentamethylcyclopentadienyl)zirconium(methyl)-tetraphenylborate)tetrahydrofuran complex, a
cyclopentadienyl(indenyl)zirconium(methyl)(tetraphenylborate)tetrahydrofuran complex, a
dimethylcyclopentadienyl(cyclopentadienyl)zirconium(hydride)(tetraphenylborate)tetrahydrofuran complex, a
trimethylcyclopentadienyl(cyclopentadienyl)zirconium(hydride)(tetraphenylborate)tetrahydrofuran complex, a
bis(pentamethylcyclopentadienyl)zirconium(hydride)(tetraphenylborate)tetrahydrofuran complex. an
indenyl(cyclopentadienyl)zirconium(hydride)(tetraphenylborate)tetrahydrofuran complex, a
trimethylsilylcyclopentadienyl(cyclopentadienyl)zirconium(methyl)(tetraphenylborate)tetrahydrofuran complex, a
trimethylsilylcyclopentadienyl(cyclopentadienyl)zirconium(hydride)(tetraphenylborate)tetrahydrofuran complex, a
trifluoromethylcyclopentadienyl(cyclopentadienyl)zirconium(hydride)(tetraphenylborate)tetrahydrofuran complex, a
bis(cyclopentadienyl)(trimethylsilyl)zirconium(tetraphenylborate)tetrahydrofuran complex, a
bis(cyclopentadienyl)(triphenylsilyl)zirconium(tetraphenylborate)tetrahydrofuran complex, a
bis(cyclopentadienyl)[tris(dimethylsilyl)silyl]zirconium(tetraphenylborate)tetrahydrofuran complex,
bis(cyclopentadienyl)(trimethylsilylmethyl)zirconium(tetraphenylborate)tetrahydrofuran complex, a
bis(cyclopentadienyl)(benzyl)zirconium(tetraphenylborate)tetrahydrofuran complex, a
methylene-bis(cyclopentadienyl)zirconium(chloride)-tetraphenylborate)tetrahydrofuran complex, an
ethylene-bis(cyclopentadienyl)zirconium(chloride)tetraphenylborate)tetrahydrofuran complex, an
isopropylidene-bis(cyclopentadienyl)zirconium(chloride)tetraphenylborate)tetrahydrofuran complex, a
dimethylsilyl-bis(cyclopentadienyl)zirconium(chloride)(tetraphenylborate)tetrahydrofuran complex, a
methylene-bis(cyclopentadienyl)zirconium(methyl)(tetraphenylborate)tetrahydrofuan complex, an
ethylene-bis(cyclopentadienyl)zirconium(methyl)(tetraphenylborate)tetrahydrofuran complex, an
isopropylidenebis(cyclopentadienyl)zirconium(methyl)(tetraphenylborate)tetrahydrofuran complex, a
dimethylsilyl-bis(cyclopentadienyl)zirconium(methyl)-(tetraphenylborate)tetrahydrofuran complex, a
methylene-bis(cyclopentadienyl)zirconium(hydride)(tetraphenylborate)tetrahydrofuran complex, an
ethylene-bis(cyclopentadienyl)zirconium(hydride)(tetraphenylborate)tetrahydrofuran complex,
an isopropylidene-bis(cyclopentadienyl)zirconium(hydride)(tetraphenylborate)tetrahydrofuran complex and a
dimethylsilyl-bis(cyclopentadienyl)zirconium(hydride)(tetraphenylborate)tetrahydrofuran complex.

Further, with respect to compounds of other metals of Group 4, 5 and 6, such as titanium compounds and hafnium compounds, those similar to the above compounds may be mentioned. Further, a mixture of such compounds may also be employed.

In the present invention, as component (B), clay, clay minerals, ion exchanging layered compounds, diatomaceous earth, silicates or zeolites are employed. Clay is usually composed of clay minerals as the main constituents. The ion exchanging layered compounds are compounds having a crystal structure in which faces constituted by e.g. ionic bonds are piled in parallel to one another by a weak bonding force and the contained ions are exchangeable. The majority of clay minerals are ion exchanging layered compounds. These clay, clay minerals and ion exchanging layered compounds may not only be natural products but also be artificially synthesized products.

As component (B), clay, clay minerals or ion exchanging compounds having a layered crystal structure of e.g. a hexagonal most densely packed type, antimony type, $CdCl_2$ type or $CdI_2$ type, may be mentioned. Specific examples of the clay, clay minerals and ion exchanging layered compounds of component (B) include kaolin, bentonite, kibushi clay, gairome clay, allophane, hisingerite, pyrophyllite, talc, a mica group, a montmorillonite group, vermiculite, a chlorite group, palygorskite, kaolinite, nacrite, dickite and halloysite. The silicates, zeolite and diatomaceous earth to be used as component (B) in the present invention may be synthesized products or naturally produced minerals. Further, they may be used as they are without subjecting them to any treatment, or they may be treated by ball milling, sieving, acid treatment or the like before use. Further, they may be treated to have water added and adsorbed or may be treated for dehydration under heating before use. They may be used alone or in combination as a mixture of two or more of them.

Specific examples of the silicates include silicates such as lithium silicate, sodium silicate, potassium silicate, magnesium silicate, calcium silicate, barium silicate, aluminium silicate, titanium silicate and zirconium silicate, an olivaine group such as olivaine and fayalite, a garnet group such as garnet, a phenacite group such as phenacite and willemite, zircon, tricalcium silicate, merrillite, gehlenite, benitoite, beryl, cordierite, a pyroxene group such as enstatite, hypersthene, diopside, spondumene, rhodonite and wollastonite, an amphibole group such as anthophyllite, tremolite and actinolite, a feldspar group such as orthoclase, albite, barium feldspar and anorthite, a sodalite group such as sodalite and nocerite, analcite, and natrolite.

Component (B) preferably has a pore volume of pores having radii of at least 20 Å as measured by a mercury injection method of at least 0.1 cc/g, more preferably from 0.3 to 5 cc/g. Here, the pore volume is measured within a pore radius being from 20 to 30,000 Å by a mercury injection method employing a mercury porosimeter. In Examples, the pore volume was measured by "Auto Pore 9200" manufactured by Shimadzu Corporation.

When a compound having a pore volume of pores having radii of at least 20 Å of less than 0.1 cc/g, is used as component (B), it tends to be difficult to obtain high polymerization activities.

Further, component (B) is preferably subjected to chemical treatment.

Here, the chemical treatment may be surface treatment to remove impurities deposited on the surface for treatment to give an influence over the crystal structure of clay. Specifically, acid treatment, alkali treatment, salt treatment and organic substance treatment may be mentioned. The acid treatment is intended not only to remove impurities on the surface but also to elute cations such as Al, Fe or Mg in the crystal structure, whereby the surface area is increased. By the alkali treatment, the crystal structure of clay will be destroyed, and a change will be brought about to the structure of clay. Further, by the salt treatment and organic substance treatment, an ion complex, a molecular complex or an organic derivative may be formed, and the surface area and the interlaminar distance may be changed.

Further, utilizing ion exchangeability, interlaminar exchangeable ions may be substituted by other large bulky ions to obtain a layered substance having the interlaminar distance enlarged. Namely, the bulky ions play a role of pillars supporting the layered structure, and they are called pillars. Further, introduction of a different substance between the layers of a layered substance is referred to as intercalation. Guest compounds to be intercalated include, for example, cationic inorganic compounds such as $TiCl_4$ and $ZrCl_4$, metal alcholates such as $Ti(OR)_4$, $Zr(OR)_4$, $PO(OR)_3$ and $B(OR)_3$ wherein R is alkyl, aryl, etc., and metal hydroxide ions such as $[Al_{13}O_4(OH)_{24}]^{7+}$, $Zr_4(OH)_{14}]^{2+}$ and $[Fe_3O(OCOCH_3)_6]^+$. These compounds may be used alone, or two or more may be used in combination. During intercalation of these compounds, a polymer obtained by hydrolysis of e.g. a metal alcholate such as $Si(OR)_4$, $Al(OR)_3$ or $Ge(OR)_4$, or a colloidal inorganic compound such as $SiO_2$, may be present. As an example of pillars, an oxide which will be formed by dehydration under heating after the intercalation of the above hydroxide ions between the layers, may be mentioned.

Component (B) may be used as it is, or it may have water added and adsorbed afresh or may be subjected to heat dehydration treatment before use. Further, the above solid materials may be used alone or in combination as a mixture of two ore more of them.

Particularly preferred as component (B) is clay or clay minerals, and most preferred is montmorillonite.

Component (C) i.e. an organic aluminum compound to be used in the present invention may be compounds of the formula $AlR^6_jX_{3-j}$ wherein $R^6$ is a $C_{1-20}$ hydrocarbon group, X is hydrogen, halogen or an alkoxy group, and j is a number satisfying $0<j\leq 3$, or low molecular weight polymers of organic aluminum compounds in which aluminum atoms are bonded to one another with oxygen or nitrogen interposed therebetween. These materials may be used alone or in combination as a mixture.

Specifically, component (C) may, for example, be a trialkylaluminum such as trimethylaluminum, triethylaluminum, tripropylaluminum or triisobutylaluminum, a halogen-containing organic aluminum compound such as diethylaluminium chloride, di-n-propylaluminum chloride or diisobutylaluminium chloride, an alkoxide-containing organic aluminum compound such as dimethylaluminum methoxide or diethylaluminum methoxide, a hydride-containing organic aluminum compound such as dimethylaluminum hydride or diethylaluminum hydride, or an aluminoxane such as methylaluminoxane, ethylaluminoxane or isobutylaluminoxane. Among them, a trialkylaluminum or an aluminoxane is preferred, and a trialkylaluminum is particularly preferred.

With respect to a method of contacting components (A), (B) and (C) to obtain a polymerization catalyst, when component (B) is clay or clay minerals, it is preferred to conduct the contacting reaction so that the molar ratio of the transition metal in component (A), the hydroxyl groups in the clay or clay minerals of component (B) and the aluminum in the organic aluminum compound of component (C) would be 1:0.1–100,000:0.1–10,000,000, particularly 1:0.5–10,000:0.5–1,000,000. When component (B) is other than clay or clay minerals, it is preferred to conduct the contacting reaction so that the weight ratio of the transition metal in component (A) to the aluminum in component (C), per gram of component (B), would be 0.00001-1 (g):0.001-100 (g).

The contacting may be conducted in an inert gas such as nitrogen or in an inert hydrocarbon solvent such as pentane, hexane, heptane, toluene or xylene. The contacting is conducted usually at a temperature within a range of from $-20°$ C. to the boiling point of the solvent, preferably within a range of from room temperature to the boiling point of the solvent.

Further, as the organic aluminum compound of component (D) which is used as the case requires in the present invention, the same compounds as for component (C) may be mentioned. The amount of the organic aluminum compound to be used for this purpose is selected so that the molar ratio of the transition metal in component (A) to the aluminum in component (D) would be 1:0-10,000.

The contacting order of the respective components of the catalyst is not particularly limited. However, they may, for example, be contacted in the following orders:

① Components (A) and (B) are contacted, and then component (C) is added.
② Components (A) and (C) are contacted, and then component (B) is added.
③ Components (B) and (C) are contacted, and then component (A) is added.

Other than the above orders, the three components may simultaneously be contacted.

During or after contacting the respective catalyst components, a polymer such as polyethylene or polypropylene, or a solid of an inorganic oxide such as silica or alumina, may be present or contacted.

Further, an olefin may be prepolymerized in the presence of components (A), (B) and (C) and, if necessary, an organic aluminum compound of component (D), to form a catalyst, and polymerization of an olefin may be conducted in the presence of this catalyst and, if necessary, an organic aluminum compound. The temperature for the prepolymerization is usually within a range of from $-50°$ to $+100°$ C., and the time for the prepolymerization is usually from 0.1 to 100 hours, preferably from 0.1 to 50 hours.

As the organic aluminum compound of component (D) which is used as the case requires at the time of the prepolymerization, the same compounds as for component (C) may be employed. The amount of the organic aluminum compound to be used for this purpose is selected so that the molar ratio of the transition metal in component (A) to the aluminum in component (D) would be 1:0-10,000.

The olefin to be used for the prepolymerization is preferably the olefin to be used for the subsequent polymerization, but other olefin may be used. Further, two or more olefins may be used in combination as a mixture.

The amount of the polymer formed by the prepolymerization is usually within a range of from 0.001 to 1,000 g, preferably from 0.01 to 300 g, more preferably from 0.1 to 300 g, per gram of component (B).

The solvent to be used for the production of the catalyst for polymerizing an olefin according to the present invention, may, for example, be butane, pentane, hexane, heptane, octane, cyclohexane, toluene or xylene, or a mixture thereof.

The solid catalyst thus obtained, may be used without washing or after washing.

The olefin to be used for polymerization may be ethylene, propylene, 1-butene, 1-hexene, 3-methyl-1-butene, 3-methyl-1-pentene, 4-methyl-1-pentene, vinylcycloalkane, styrene or derivatives thereof. This polymerization may suitably be applied not only to homopolymerization but also to usual random copolymerization or block copolymerization.

The polymerization reaction is conducted in the presence or absence of a solvent such as a liquefied α-olefin or an inert hydrocarbon such as butane, pentane, hexane, heptane, toluene or cyclohexane. The temperature is usually within a range of from $-50°$ to $+250°$ C. The pressure is not particularly limited, but is preferably within a range of from atmospheric pressure to about 2,000 kgf/cm$^2$.

Further, hydrogen as a molecular weight controlling agent may be present in the polymerization system.

According to the method of the present invention, it is possible to obtain an olefin polymer having a narrow molecular weight distribution, or when applied to copolymerization of two or more olefins, an olefin polymer having narrow molecular weight and compositional distributions, under very high polymerization activities, whereby it is unnecessary to remove the catalyst residue from the obtained polymer. Thus, the present invention is very useful from the industrial point of view.

PREFERRED EMBODIMENTS OF THE INVENTION

Now, the present invention will be described in further detail with reference to Examples. However, it should be understood that the present invention is by no means restricted by such specific Examples.

EXAMPLE 1

(1) Preparation of a Catalyst Component

Into a 300 ml round bottom flask, 17 g of commercially available montmorillonite (Montmorillonite K10, manufactured by Aldrich Company; pore volume of pores having radii of at least 20 Å as measured by a mercury injection method: 1.004 cc/g; same applies hereinafter) was introduced, and the interior of the flask was flushed with nitrogen. Then, 50 ml of toluene was added thereto to obtain a slurry. Separately, 7.21 g of trimethylaluminum was dissolved in 50 ml of toluene. While vigorously stirring the montmorillonite slurry, the trimethylaluminum solution was slowly dropwise added thereto at room temperature. Heat was generated accompanied by generation of gas. Stirring was continued for two hours while properly cooling with ice water to obtain a gray greenish slurry.

(2) Polymerization of Ethylene 2.5 mg of biscyclopentadienylzirconium dichloride was preliminarily contacted with 4.8 ml of a toluene solution of 0.0179M trimethylaluminum for 30 minutes at room temperature under a nitrogen atmosphere, and the mixture was contacted with 4.7 ml of the catalyst component slurry prepared in the above step (1) for 20 minutes. Into a 2 l induction-stirring type autoclave flushed with purified nitrogen, 500 ml of toluene and the above catalyst component-contacted mixture were charged at room temperature under a nitrogen stream. The mixed solution was heated to 70° C. Then, ethylene was introduced so that the ethylene partial pressure would be 9 kgf/cm$^2$, and polymerization was conducted for one hour. Then, supply of ethylene was stopped, and ethanol was introduced to terminate the polymerization. Then, the content in the autoclave was cooled to 30° C., and the interior gas was purged to obtain 170 g of powdery polyethylene. The amount of the polyethylene produced per gram of the zirconium was $2.2 \times 10^5$ g, and the polymerization activities were 7,600 g-PE/g-cat.h.kgf.cm$^{-2}$. The amount of the polyethylene produced per gram of the aluminum derived from trimethylaluminum contacted to montmorillonite and biscyclopentadienylzirconium dichloride, was 1,600 g.

EXAMPLE 2

(1) Copolymerization of Ethylene and Propylene 0.27 mg of biscyclopentadienylzirconium dichloride was preliminarily contacted with 0.48 ml of a toluene solution of 0.0179M trimethylaluminum for 30 minutes at room temperature under a nitrogen atmosphere, and the mixture was further preliminarily contacted with 0.47 ml of the catalyst component slurry prepared in Example 1 (1) for 20 minutes.

Into a 2 l induction-stirring type autoclave flushed with purified nitrogen, 300 ml of toluene and the above catalyst-contacted mixture were introduced at room temperature under a nitrogen stream. Further, 600 ml of liquid propylene was introduced. The mixture was heated to 70° C. Then, ethylene was introduced so that the ethylene partial pressure would be 7.6 kgf/cm$^2$, and polymerization was conducted for one hour. Then, supply of ethylene was stopped, and ethanol was introduced to terminate the polymerization. Then, the content of the autoclave was cooled to 30° C., and the interior gas was purged to obtain 100 g of an ethylene-propylene copolymer. The amount of the copolymer produced per gram of the zirconium was $1.2 \times 10^6$ g. Further, the amount of the copolymer produced per gram of the aluminum derived from trimethylaluminum contacted with montmorillonite and biscyclopentadienylzirconium dichloride, was 8,600 g. The molecular weight distribution of the obtained copolymer was Mw/Mn=2.1.

(2) Copolymerization of Ethylene and Propylene 0.25 mg of biscyclopentadienylzirconium dichloride was preliminarily contacted with 0.47 ml of the catalyst component slurry prepared in Example 1 (1) for 20 minutes at room temperature under a nitrogen atmosphere. The subsequent operation was conducted in the same manner as in Example 2 (1) to obtain 38.7 g of an ethylenepropylene copolymer. The amount of the copolymer produced per gram of the zirconium was $4.9 \times 10^5$ g. Further, the amount of the copolymer produced per gram of the aluminum derived from trimethylaluminum contacted with montmorillonite, was 3,300 g.

EXAMPLE 3

(1) Preparation of a Catalyst Component

Into a 500 ml round bottom flask, 6.46 g of commercially available kaolin (manufactured by Fisher Scientific Co.; acid-washed product; pore volume of pores having radii of at least 20 Å as measured by a mercury injection method: 0.691 cc/g) was introduced. The interior of the flask was flushed with nitrogen, and then 200 ml of toluene was added to obtain a slurry. Separately, 7.21 g of trimethylaluminum was dissolved in 50 ml of toluene. While vigorously stirring the kaolin slurry, the trimethylaluminum solution was slowly dropwise added thereto at room temperature. Then, refluxing was conducted for two hours to obtain a brown slurry.

(2) Copolymerization of Ethylene and Propylene 2.7 mg of biscyclopentadienylzirconium dichloride was preliminarily contacted with 0.44 ml of a toluene solution of 0.196M trimethylaluminum for 30 minutes at room temperature under a nitrogen atmosphere, and the mixture was further preliminarily contacted with 14 ml of the catalyst component slurry prepared in the above step (1) for 20 minutes. The subsequent operation was conducted in the same manner as in Example 2 (1) to obtain 105 g of an ethylene-propylene copolymer. The amount of the copolymer produced per gram of the zirconium was $1.3 \times 10^5$ g. Further, the amount of the copolymer produced per gram of the aluminum derived from trimethylaluminum contacted with kaolin and biscyclopentadienylzirconium dichloride, was 844 g.

EXAMPLE 4

(1) Preparation of bis(cyclopentadienyl)(methyl)zirconium(tetraphenylborate) -tetrahydrofuran complex of component (A)

Into a 300 ml round bottom flask, 7.5 g of commercially available biscyclopentadienylzirconium dichloride was introduced, and the interior of the flask was flushed with nitrogen. Then, 120 ml of diethyl ether was added thereto at −20° C. to obtain a slurry. To this slurry, 32 ml of a hexane solution of methyllithium (1.6M) was slowly added at −20° C., and the mixture was stirred at 0° C. for 30 minutes. Then, the solvent was distilled, and the remained solid was purified by sublimation under reduced pressure of $2 \times 10^{-4}$ mmHg at a temperature of from 60° to 80° C. to obtain biscyclopentadienylzirconium dimethyl. Separately, an aqueous solution containing 3.4 g of silver nitrate and 6.84 g of sodium tetraphenyl borate were mixed to obtain a silver tetraphenyl borate.

Then, biscyclopentadienylzirconium dimethyl prepared as described above, was dissolved in 10 ml of acetonitrile, and to this solution, a slurry of 1.0 g of silver tetraphenyl borate in acetonitrile (10 ml) was added at 0° C., and the mixture was stirred for one hour. The obtained solution was separated from solid and evaporated to dryness, followed by washing with cool acetonitrile. Then, the product was recrystallized from acetonitrile and then dried under reduced pressure for 48 hours. The obtained solid was recrystallized three times from tetrahydrofuran to obtain a bis(cyclopentadienyl)(methyl)zirconium(tetraphenylborate) tetrahydrofuran complex.

(2) Copolymerization of ethylene and propylene

Copolymerization of ethylene and propylene was conducted by using a catalyst prepared by preliminarily contacting 0.55 mg of bis(cyclopentadienyl)(methyl)zirconium(tetraphenylborate) tetrahydrofuran complex obtained in step (1) with 0.49 ml of a toluene solution of 0.196M trimethylaluminum for 30 minutes at room temperature under a nitrogen atmosphere and further preliminarily contacting the mixture with 0.48 ml of the catalyst component slurry prepared in Example 1 (1) for 20 minutes. The subsequent operation was conducted in the same manner as in Example 2 (1) to obtain 24.2 g of an ethylene-propylene copolymer. The amount of the copolymer produced per gram of the zirconium was 3.0×10⁵ g. Further, the amount of the copolymer produced per gram of the aluminum derived from trimethylaluminum contacted with montmorillonite and component (A), was 2,200 g.

COMPARATIVE EXAMPLE 1

0.97 mg of biscyclopentadienylzirconium dichloride was preliminarily contacted with a toluene solution of 5.00 mM, as aluminum atom, of methylaluminoxane (molecular weight: 1232; manufactured by TOSO-ACZO) for 30 minutes at room temperature under a nitrogen atmosphere.

Into a 2 l induction-stirring type autoclave flushed with purified nitrogen, 500 ml of toluene and a mixed solution of biscyclopentadienylzirconium dichloride and methylaluminoxane were introduced at room temperature under a nitrogen stream. The mixed solution was heated to 70° C., and then ethylene was introduced so that the ethylene partial pressure would be 9 kgf/cm², and polymerization was conducted for one hour. Then, supply of ethylene was stopped, and the content of the autoclave was cooled to 30° C., and the interior gas was purged to obtain 11.6 g of powdery polyethylene. The amount of the polyethylene produced per gram of the zirconium was $3.8 \times 10^4$ g, and the catalytic activities were 1,300 g-PE/g-cat.h.kgf.cm$^{-2}$. Further, the amount of the polyethylene produced per gram of the aluminum derived from methylaluminoxane, was 86 g.

EXAMPLE 5

(1) Preparation of a catalyst

Into a 100 ml round bottom flask, 8.9 mg of commercially available biscyclopentadienylzirconium dichloride was introduced, and the interior of the flask was flushed with nitrogen. Then, 25 ml of n-heptane was added thereto to obtain a slurry. Separately, 1.18 g of trimethylaluminum and 3.72 g of commercially available montmorillonite were separately taken, and 5 ml and 15 ml of n-heptane were added, respectively. While vigorously stirring the biscyclopentadienylzirconium dichloride, the montmorillonite slurry was dropwise added thereto at room temperature and then the trimethylalminum solution was dropwise added thereto. Heat was generated accompanied by generation of gas. After completion of the dropwise addition, stirring was continued for two hours to obtain a gray slurry. The zirconium concentration in the catalyst slurry was 0.72 μmol/ml.

(2) Polymerization of Ethylene

Into a 2 l induction-stirring type autoclave flushed with purified nitrogen, 300 ml of n-hexane, 1.9 ml of a toluene solution of trimethylaluminum (10.18 mM) and 3.9 ml of the above catalyst slurry were sequentially introduced at room temperature under nitrogen stream. The mixed solution was heated to 70° C., and then ethylene was introduced so that the ethylene partial pressure would be 9 kgf/cm² and polymerization was conducted for 30 minutes. Then, supply of ethylene was stopped, and ethanol was introduced to terminate the polymerization. Then, the content of the autoclave was cooled to 30° C., and the interior gas was purged to obtain 230 g of powdery polyethylene. The amount of the polymer produced per gram of the zirconium was $9.0 \times 10^5$ g. Further, the amount of the polymer produced per gram of the aluminum derived from trimethylaluminum, was 8,500 g.

(3) Copolymerization of Ethylene and Propylene

Into a 2 l induction-stirring type autoclave flushed with purified nitrogen, 300 ml of n-hexane, 1.9 ml of a toluene solution of trimethylaluminum (10.18 mM) and 2.6 ml of the above catalyst slurry were sequentially introduced at room temperature under a nitrogen stream. Further, 600 ml of liquid propylene was introduced. The mixed solution was heated to 70° C., and then ethylene was introduced so that the ethylene partial pressure would be 7.6 kgf/cm², and polymerization was conducted for 25 minutes. Then, supply of ethylene was stopped, and ethanol was introduced to terminate the polymerization. Then, the content of the autoclave was cooled to 30° C., and the interior gas was purged to obtain 243 g of an ethylene-propylene copolymer. The amount of the copolymer produced per gram of the zirconium was $1.4 \times 10^6$ g. Further, the amount of the copolymer produced per gram of the aluminum derived from trimethylaluminum, was 9,200 g.

EXAMPLE 6

(1) Preparation of a Catalyst Component

Into a 300 ml round bottom flask, 17.7 g of commercially available montmorillonite was introduced, and the interior of the flask was flushed with nitrogen. Then, 80 ml of toluene was added thereto to obtain a slurry. Separately, 5.86 g of trimethylaluminum was dissolved in 20 ml of toluene. While vigorously stirring the trimethylaluminum solution, the montmorillonite slurry was dropwise added thereto at room temperature. Heat was generated accompanied by generation of gas. After completion of the dropwise addition, stirring was continued for two hours to obtain a greenish gray slurry.

(2) Copolymerization of Ethylene and propylene 0.57 mg of biscyclopentadienylzirconium dichloride was preliminarily contacted with 1.9 ml of a toluene solution of 10.10 mM trimethylaluminum for 30 minutes at room temperature under a nitrogen atmosphere, and the mixture was further preliminarily contacted with 1.3 ml of the catalyst component slurry prepared in the above step (1). The subsequent operation was conducted in the same manner as in Example 2 (1) except that the polymerization time was changed to 30 minutes instead of one hour, to obtain 310 g of an ethylene-propylene copolymer. The amount of the copolymer produced per gram of the zirconium was $1.8 \times 10^6$ g. Further, the amount of the copolymer produced per gram of the aluminum derived from trimethylaluminum contacted with montmorillonite and biscyclopentadienylzirconium dichloride, was 12,000 g.

(3) Copolymerization of Ethylene and Propylene 0.50 mg of biscyclopentadienylzirconium dichloride was preliminarily contacted with 1.8 ml of a toluene solution of 9.50 mM triethylaluminum for 30 minutes at room temperature under a nitrogen atmosphere, and the mixture was further preliminarily contacted with 1.1 ml of the catalyst component slurry prepared in the above step (1). The subsequent operation was conducted in the same manner as in Example 6 (2) to obtain 229 g of an ethylene-propylene copolymer. The amount of the copolymer produced per gram of the zirconium was $1.9 \times 10^6$ g. Further, the amount of the copolymer produced per gram of the aluminum derived from trimethylaluminum contacted with montmorillonite and triethylaluminum contacted with biscyclopentadienylzirconium dichloride, was 13,000 g.

EXAMPLE 7

(1) Preparation of Ethylene Bis(4,5,6,7-Tetrahydroindenyl)Zirconium dichloride

Preparation of the above complex was conducted in the same manner as disclosed with respect to ethylene bis(4,5,6,7-tetrahydroindenyl)titanium dichloride in Journal of Organometallic Chemistry, 232 (1982) 233.

(2) Polymerization of Propylene 0.82 mg of a racemic modification of ethylene bis(4,5,6,7-tetrahydroindenyl)zirconium dichloride was preliminarily contacted with 1.9 ml of a toluene solution of 10.10 mM trimethylaluminum for 30 minutes at room temperature under a nitrogen atmosphere, and the mixture was further preliminarily contacted with 1.3 ml of the catalyst component slurry prepared in Example 6 (1).

Into a 2 l induction-stirring type autoclave thoroughly flushed with purified nitrogen, 300 ml of toluene and the above catalyst component-contacted mixture were introduced at room temperature under a nitrogen stream. Further, 600 ml of liquid propylene was introduced. The autoclave was heated to 70° C., and polymerization was conducted for 30 minutes. Then, the gas in the autoclave was purged to obtain 286 g of a propylene polymer. The amount of the polymer produced per gram of the zirconium was $1.6 \times 10^6$ g. Further, the amount of the propylene polymer produced per gram of the aluminum derived from trimethylaluminum contacted with montmorillonite and ethylene bis(4,5,6,7-tetrahydroindenyl)zirconium chloride, was 9,900 g. Further, the boiling heptane insoluble content (value obtained after refluxing for six hours) representing the stereospecificity, was 96%.

COMPARATIVE EXAMPLE 2

0.82 mg of a racemic modification of ethylene bis(4,5,6,7-tetrahydroindenyl)zirconium dichloride was contacted with 1.9 ml of a toluene solution of 10.10 mM trimethylaluminum for 30 minutes at room temperature in a nitrogen atmosphere, and the mixture was further preliminarily contacted with a toluene solution of 12.5 mM, as aluminum atom, of methylaminoxane (manufactured by TOSO-ACZO). Using the product, polymerization of propylene was conducted. Into a 2 l induction-stirring type autoclave thoroughly flushed with purified nitrogen, 300 ml of toluene and a mixed solution of ethylene bis(4,5,6,7-tetrahydroindenyl)zirconium dichloride and methylaluminoxane were introduced at room temperature under a nitrogen stream. Further, 600 ml of liquid propylene was introduced. The autoclave was heated to 70° C., and polymerization was conducted for one hour. Then, the interior gas was purged to obtain 115 g of a propylene polymer. The amount of the propylene polymer produced per gram of the zirconium was $6.6 \times 10^5$ g. Further, the amount of propylene polymer produced per gram of the aluminum derived from methylaluminoxane was 340 g. Further, the boiling heptane insoluble content was 96%.

EXAMPLE 8

(1) Preparation of Isopropylidene(Cyclopentadienyl)(Fluorenyl)Zirconium Dichloride Preparation of the above complex was conducted by the same method as disclosed in Japanese Unexamined Patent Publication No. 41305/1990.

(2) Polymerization of Propylene 0.83 mg of isopropylidene(cyclopentadienyl)(fluorenyl)zirconium dichloride was preliminarily contacted with 1.9 ml of a toluene solution of 10.10 mM trimethylaluminum for 30 minutes at room temperature in a nitrogen atmosphere, and the mixture was further preliminarily contacted with 1.3 ml of the catalyst component slurry prepared in Example 6 (1). The subsequent operation was conducted in the same manner as in Example 7 (2) to obtain 253 g of a propylene polymer. The amount of the propylene polymer produced per gram of the zirconium was $1.4 \times 10^6$ g. Further, the amount of the polymer produced per gram of the aluminum derived from trimethylaluminum contacted with montmorillonite and isopropylidene(cyclopentadienyl)(fluorenyl)zirconium dichloride, was 8,800 g. The rrrr by $^{13}$C-NMR of the obtained polymer i.e. the syndiotactic polymer content was 90%.

COMPARATIVE EXAMPLE 3

0.83 mg of isopropylidene(cyclopentadienyl)(fluorenyl)zirconium dichloride was preliminarily contacted with a toluene solution of 12.5 mM, as aluminum atom, of methylaluminoxane (manufactured by TOSO-ACZO) for 30 minutes at room temperature under a nitrogen atmosphere.

Into a 2 l induction-stirring type autoclave thoroughly flushed with purified nitrogen, 300 ml of toluene and a mixed solution of the above isopropylidene(cyclopentadienyl)(fluorenyl)zirconium dichloride and methylaluminoxane were charged at room temperature under a nitrogen stream. Further, 600 ml of liquid propylene was introduced. The autoclave was heated to 70° C., and polymerization was conducted for one hour. Then, the interior gas of the autoclave was purged to obtain 108 g of a propylene polymer. The amount of the propylene polymer produced per gram of the zirconium was $6.2 \times 10^5$ g. Further, the amount of the propylene polymer produced per gram of the aluminum derived from methylaluminoxane, was 320 g. The rrrr by $^{13}$C-NMR of the obtained polymer was 89%.

EXAMPLE 9

(1) Preparation of a Catalyst Component

Into a 300 ml round bottom flask, 18.1 g of commercially available montmorillonite was introduced, and the interior of the flask was thoroughly flushed with nitrogen. Then, 80 ml of n-heptane was added thereto to obtain a slurry. Separately, 6.25 g of trimethylaluminum was dissolved in 20 ml of n-heptane. While vigorously stirring the trimethylaluminum solution, the montmorillonite slurry was slowly dropwise added thereto at room temperature. Heat was generated accompanied by the generation of gas. After completion of the dropwise addition, stirring was continued for two hours to obtain a gray slurry.

(2) Copolymerization of Ethylene and Propylene 0.59 mg of biscyclopentadienylzirconium dichloride was preliminarily contacted with 2.0 ml of a toluene solution of 0.0102M trimethylaluminum for 30 minutes at room temperature under a nitrogen atmosphere, and the mixture was further preliminarily contacted with 1.2 ml of the catalyst component slurry prepared in the above step (1) for 20 minutes.

Into a 2 l induction-stirring type autoclave thoroughly flushed with purified nitrogen, 300 ml of n-hexane and the above catalyst component-contacted mixture were introduced at room temperature under a nitrogen stream. Further, 600 ml of liquid propylene was introduced. The mixed solution was heated to 70° C., and then ethylene was introduced so that the ethylene partial pressure would be 7.6 kgf/cm$^2$, and polymerization was conducted for 20 minutes. Then, supply of ethylene was stopped, and ethanol was introduced to terminate the polymerization. Then, the content of autoclave was cooled to 30° C., and the interior gas was purged to obtain 311 g of an ethylene-propylene copolymer. The amount of the copolymer produced per gram of the zirconium was $1.7 \times 10^6$ g. Further, the amount of the copolymer produced per gram of the aluminum derived from trimethylaluminum contacted with montmorillonite and biscyclopentadienylzirconium dichloride, was 11,000 g.

EXAMPLE 10

(1) Preparation of a Catalyst

Into a 300 ml round bottom flask, 15.1 mg of commercially available biscyclopentadienylzirconium dichloride was introduced, and the interior of the flask was purged with nitrogen. Then, 50 ml of n-heptane was added thereto to obtain a slurry. Separately, 1.99 g of trimethylaluminum and 6.21 g of commercially available montmorillonite were taken, separately, and 10 ml and 40 ml of n-heptane were added, respectively. While vigorously stirring the biscyclopentadienylzirconium dichloride slurry, the trimethylaluminum solution was dropwise added thereto at room temperature, and then the montmorillonite slurry was dropwise added. Heat was generated accompanied by generation of gas. After completion of the dropwise addition, stirring was continued for two hours to obtain a gray slurry. The zirconium concentration in the catalyst slurry was 0.49 μmol/ml.

(2) Polymerization of Ethylene

Into a 2 l induction-stirring type autoclave flushed with purified nitrogen, 300 ml of n-hexane, 1.9 ml of a toluene solution of trimethylaluminum (10.18 mM) and 3.9 ml of the above catalyst slurry were sequentially introduced at room temperature under a nitrogen stream. The mixed solution was heated to 70° C., and then ethylene was introduced so that the ethylene partial pressure would be 9 kgf/cm$^2$, and polymerization was conducted for 15 minutes. Then, supply of ethylene was stopped, and ethanol was introduced to terminate the polymerization. Then, the content of the autoclave was cooled to 30° C., and the interior gas was purged to obtain 244 g of powdery polyethylene. The amount of the polymer produced per gram of the zirconium was $1.4 \times 10^6$ g. Further, the amount of the polymer produced per gram of the aluminum derived from trimethylaluminum, was 8,800 g.

(3) Copolymerization of Ethylene and Propylene

Into a 2 l induction-stirring type autoclave flushed with purified nitrogen, 300 ml of n-hexane, 1.9 ml of a toluene solution of trimethylaluminum (10.18 mM) and 3.9 ml of the above catalyst slurry were sequentially introduced at room temperature under a nitrogen stream. Further, 600 ml of liquid propylene was introduced. The mixed solution was heated to 70° C., and then ethylene was introduced so that the ethylene partial pressure would be 7.6 kgf/cm$^2$, and polymerization was conducted for 16 minutes. Then, supply of ethylene was stopped, and ethanol was introduced to terminate the polymerization. Then, the content of the autoclave was cooled to 30° C., and the interior gas was purged to obtain 302 g of an ethylene-propylene copolymer. The amount of the copolymer produced per gram of the zirconium was $1.7 \times 10^6$ g. Further, the amount of the copolymer produced per gram of the aluminum derived from trimethylaluminum, was 11,000 g.

EXAMPLE 11

(1) Preparation of a Catalyst

Into a 200 ml round bottom flask, 3.12 g of vermiculite with a pore volume of pores having radii of at least 20 Å as measured by a mercury injection method being 0.791 cc/g, was introduced, and the interior of the flask was flushed with nitrogen. Then, 50.8 ml of n-hexane was added thereto to obtain a slurry. Separately, 1.25 g of trimethylaluminum was dissolved in 20.6 ml of n-hexane. While stirring the vermiculite slurry, the trimethylaluminum solution was slowly dropwise added thereto at room temperature. Stirring was continued for two hours while properly cooling the mixture to obtain a slurry.

(2) Copolymerization of Ethylene and Propylene 1.40 mg of biscyclopentadienylzirconium dichloride was preliminarily contacted with a toluene solution of trimethylaluminum (23.8 μmol) for 30 minutes at room temperature under a nitrogen atmosphere, and the mixture was further preliminarily contacted with 5.0 ml of the catalyst component slurry prepared in Example 11 (1) for 20 minutes.

Into a 2 l induction-stirring type autoclave flushed with purified nitrogen, 300 ml of n-hexane and the above catalyst component contacted mixture were introduced at room temperature under a nitrogen stream. Further, 600 ml of liquid propylene was introduced. The mixed solution was heated to 70° C., and then ethylene was introduced so that the ethylene partial pressure would be 7.6 kgf/cm$^2$, and polymerization was conducted for one hour. Then, supply of ethylene was stopped, and ethanol was introduced to terminate the polymerization. Then, the content of the autoclave was cooled to 30° C., and the interior gas was purged to obtain 55.6 g of an ethylene-propylene copolymer. The amount of the copolymer produced per gram of the zirconium was $1.3 \times 10^5$ g. Further, the amount of the copolymer produced per gram of the aluminum derived from trimethylaluminum contacted with vermiculite and biscyclopentadienylzirconium dichloride, was 1,700 g.

EXAMPLE 12

(1) Preparation of a Catalyst

Into a 200 ml round bottom flask, 4.11 g of Smecton SA-1 (manufactured by Kumine Kogyo K. K.) with a pore volume of pores having radii of at least 20 Å as measured by a mercury injection method being 0.712 cc/g, was introduced, and the interior of the flask was flushed with nitrogen. Then, 81.2 ml of n-hexane was added thereto to obtain a slurry. Separately, 1.92 g of trimethylaluminum was dissolved in 20.2 ml of n-hexane. While stirring the Smecton SA-1 slurry, the trimethylaluminum solution was thoroughly dropwise added thereto at room temperature. Stirring was continued for two hours, while properly cooling the mixture to obtain a slurry.

(2) Copolymerization of Ethylene and Propylene 1.28 mg of biscyclopentadienylzirconium dichloride was preliminarily contacted with a toluene solution of triemthylaluminium (21.9 μmol) for 30 minutes at room temperature under a nitrogen atmosphere, and the mixture was further preliminarily contacted with 4.3 ml of the catalyst component slurry prepared in Example 12 (1) for 20 minutes. The subsequent operation was conducted in the same manner as in Example 11 (2) to obtain 48.4 g of an ethylene-propylene copolymer. The amount of the copolymer produced per gram of the zirconium was $1.2 \times 10^5$ g. Further, the amount of the copolymer produced per gram of the aluminum derived from trimethylaluminum contacted with Smecton SA-1 and biscyclopentadienylzirconium dichloride, was 1,600 g.

EXAMPLE 13

(1) Preparation of a Catalyst

Into a 100 ml round bottom flask thoroughly flushed with nitrogen, a toluene solution containing 0.72 g of commercially available biscyclopentadienylzirconium dichloride was introduced, and 1.3 mM of trimethylaluminum was added thereto under stirring at room temperature. Separately, into a 100 ml round bottom flask, 3.33 g of mica with a pore volume of pores having radii of at least 20 Å as measured by a mercury injection method being 0.670 cc/g, was introduced, and the interior of the flask was flushed with nitrogen. Then, 63.9 ml of n-hexane was added thereto to obtain a slurry. 4.9 ml of this slurry was added to the above contacted product of biscyclopentadienylzirconium dichloride and trimethylaluminum, at room temperature. After completion of the addition, stirring was conducted at room temperature for one hour to obtain a catalyst slurry.

(2) Copolymerization of Ethylene and Propylene

Into a 2 l induction-stirring type autoclave flushed with purified nitrogen, 300 ml of n-hexane, 2.4 ml of a toluene solution of trimethylaluminum (10.18 mM) and the entire amount of the above catalyst slurry were introduced at room temperature under a nitrogen stream. Further, 600 ml of liquid propylene was introduced. The mixed solution was heated to 70° C., and then ethylene was introduced so that the ethylene partial pressure would be 7.6 kgf/cm², and polymerization was conducted for one hour. Then, supply of ethylene was stopped, and ethanol was introduced to terminate the polymerization. Then, the content of the autoclave was cooled to 30° C., and the interior gas was purged to obtain 42.9 g of an ethylenepropylene copolymer. The amount of the copolymer produced per gram of the zirconium was $1.9 \times 10^5$ g. Further, the amount of the copolymer produced per gram of the aluminum derived from trimethylaluminum, was 1,200 g.

EXAMPLE 14

(1) Preparation of a Zirconium-Montmorillonite intercalation compound 64.45 g of zirconium oxychloride octahydrate (guaranteed grade, manufactured by Wako Jyunyaku K. K.) was dissolved in 1 l of pure water, and 6.0 g of montmorillonite was added thereto to obtain a slurry. The slurry was stirred at 70° C. for one hour, followed by filtration and washing with 500 ml of hot pure water. Then, the product was dried in air overnight at room temperature to obtain the above-identified compound.

(2) Preparation of a Catalyst

Into a 100 ml round bottom flask, 10.0 mg of commercially available biscyclopentadienylzirconium dichloride was introduced, and the interior of the flask was flushed with nitrogen. Then, the 10 ml of n-heptane was added thereto to obtain a slurry. Separately, 1.21 g of trimethylaluminum and 3.0 g of the zirconium-montmorillonite intercalation compound prepared in the above step (1) were taken and 20 ml of n-heptane was added to each of them. While vigorously stirring the biscyclopentadienylzirconium dichloride slurry, the trimethylaluminum solution was dropwise added thereto at room temperature, and then the slurry of the zirconium-montmorillonite intercalation compound was dropwise added thereto. Heat was generated accompanied by generation of gas. After completion of the dropwise addition, stirring was continued for two hours to obtain a gray catalyst slurry. The concentration of zirconium derived from the biscyclopentadienylzirconium dichloride in the slurry was 0.65 μmol/ml.

(3) Polymerization of Ethylene

Into a 2 l induction-stirring type autoclave thoroughly flushed with purified nitrogen, 500 ml of n-hexane, 1.9 ml of a toluene solution of trimethylaluminum (10.18 mM) and 3.0 ml of the above catalyst slurry were sequentially introduced at room temperature under a nitrogen stream. The mixed solution was heated to 70° C. Then, ethylene was introduced so that the ethylene partial pressure would be 9 kgf/cm², and polymerization was conducted for one hour. Then, supply of ethylene was stopped, and ethanol was introduced to terminate the polymerization. Then, the content of the autoclave was cooled to 30° C., and the interior gas was purged to obtain 42 g of powdery polyethylene. The amount of polyethylene produced per gram of the zirconium derived from biscyclopentadienylzirconium dichloride was $1.0 \times 10^5$ g. Further, the amount of the polyethylene produced per gram of the aluminum derived from trimethylaluminum, was 7,000 g.

(4) Copolymerization of ethylene and propylene

Polymerization was conducted in the same manner as in Example 10 (3) except that 3.0 ml of the slurry of Example 14 (2) was used as the catalyst slurry, and the polymerization time was changed to one hour, to obtain 217 g of an ethylene-propylene copolymer with Mw/Mn being 2.2. The amount of the copolymer produced per gram of the zirconium derived from biscyclopentadienylzirconium dichloride, was $1.2 \times 10^6$ g. Further, the amount of the copolymer produced per gram of the aluminum derived from trimethylaluminum, was 8,300 g.

EXAMPLE 15

(1) Preparation of a Catalyst

Into a 100 ml round bottom flask, 50 mg of commercially available biscyclopentadienylzirconium dichloride was introduced, and the interior of the flask was thoroughly flushed with nitrogen. Then, 10 ml of n-heptane was added thereto to obtain a slurry. Separately, 1.25 g of trimethylaluminum and 3.0 g of the zirconium-montmorillonite intercalation compound prepared in Example 14 (1) were taken respectively, and 20 ml of n-heptane was added to each of them. While vigorously stirring the biscyclopentadienylzirconium dichloride slurry, the trimethylaluminum solution was dropwise added thereto at room temperature, and then the slurry of the zirconium-montmorillonite intercalation compound was dropwise added thereto. Heat was generated accompanied by generation of gas. After completion of the dropwise addition, stirring was continued for two hours to obtain a gray slurry. The zirconium concentration in the catalyst slurry was 3.3 μmol/ml.

Further, in a separate 100 ml round bottom flask, 40 ml of the above catalyst slurry was taken at room temperature, and 6.7 ml of a toluene solution of trimethylaluminum (196 mM) was added thereto. Then, ethylene gas was introduced into the system, and prepolymerization was conducted at room temperature for 3 hours. Then, the supernatant was removed, and the rest was washed with hexane. By this reaction, a solid catalyst comprising 35.8 μmol of zirconium derived from the biscyclopentadienylzirconium dichloride, 4.25 mM of aluminum derived from the trimethylaluminum and 3.8 g of polyethylene, per gram of the zirconium-montmorillonite intercalation compound, was obtained.

(2) Polymerization of Ethylene

Into a 2 l induction-stirring type autoclave thoroughly flushed with purified nitrogen, 150 g of dry sodium chloride, the above solid catalyst in an amount corresponding to 8.5 μmol of zirconium derived from the biscyclopentadienylzirconium dichloride and 8.4 ml of a toluene solution of trimethylaluminum (10.18 mM) were introduced at room temperature under a nitrogen stream. The content of the autoclave was heated to 70° C. Then, ethylene was introduced so that the ethylene partial pressure would be 9 kgf/cm², and polymerization was conducted for one hour. Then, the content of the autoclave was washed with water to remove sodium chloride. Then, the polymer was washed with hexane, whereby 127 g of powdery polyethylene having a bulk density of 0.45 g/cm³ and Mw/Mn being 2.3, was obtained. The amount of the polyethylene produced per gram of the zirconium derived from biscyclopentadienylzirconium dichloride was $1.6 \times 10^5$ g, and the amount of the polyethylene produced per gram of the aluminum derived from trimethylaluminum, was 4,300 g.

EXAMPLE 16

(1) Preparation of Zirconium-Bridged Montmorillonite

The zirconium-montmorillonite intercalation compound prepared in Example 14 (1) was calcined in air at 40° C. for 4 hours to obtain zirconium-bridged montmorillonite.

(2) Preparation of a Catalyst

Into a 100 ml round bottom flask, 7.5 mg of commercially available biscyclopentadienyl zirconium dichloride was introduced, and the interior of the flask was flushed with nitrogen. Then, 10 ml of n-heptane was added thereto to obtain a slurry. Separately, 0.93 g of trimethylaluminum and 2.9 g of the zirconium-bridged montmorillonite prepared in Example 16 (1) were introduced, and 20 ml of n-heptane was added to each of them. While vigorously stirring the biscyclopentadienylzirconium dichloride slurry, a trimethylaluminum solution is dropwise added thereto at room temperature, and then the zirconium-bridged montmorillonite slurry was dropwise added thereto. Heat was generated accompanied by generation of gas. After completion of the dropwise addition, stirring was continued for two hours to obtain a gray catalyst slurry. The concentration of zirconium derived from biscyclopentadienylzirconium dichloride in the slurry, was 0.50 μmol/l.

(3) Copolymerization of Ethylene and Propylene

Into a 2 l induction-stirring type autoclave flushed with purified nitrogen, 300 ml of n-hexane, 2.2 ml of a toluene solution of trimethylaluminum (10.18 mM) and 4.4 ml of the above catalyst slurry were sequentially introduced at room temperature under a nitrogen stream. Further, 600 ml of liquid propylene was introduced. The mixed solution was heated to 70° C. Then, ethylene was introduced so that the ethylene partial pressure would be 7.6 kgf/cm², and polymerization was conducted for one hour. Then, supply of ethylene was stopped, and ethanol was introduced to terminate the polymerization. Then, the content of the autoclave was cooled to 30° C., and the interior gas was purged. As a result, 199 g of an ethylene-propylene copolymer with Mw/Mn being 2.2 was obtained. The amount of the copolymer produced per gram of the zirconium derived from biscyclopentadienylzirconium dichloride, was $1.0 \times 10^6$ g. Further, the amount of the copolymer produced per gram of the aluminum derived from trimethylaluminum, was 6,600 g.

EXAMPLE 17

(1) Preparation of an aluminum-montmorillonite intercalation compound 60.4 g of aluminum chloride hexahydrate (guaranteed grade, manufactured by Wako Junyaku K. K.) was dissolved in 250 ml of pure water, and 54.0 g of metal aluminum powder (manufactured by Wako Junyaku K. K.) was added thereto. The mixture was stirred under heating on a hot bath to mildly generate hydrogen. After completion of generation of hydrogen, unreacted aluminum powder was filtered off to obtain a solution of an aluminum chlorohydroxide complex. To this solution, 20 g of montmorillonite was added, and the mixture was stirred at 70° C. for one hour. The obtained slurry was subjected to filtration, followed by washing with 500 ml of hot pure water. Then, the product was dried overnight at room temperature to obtain the above identified compound.

(2) Preparation of a Catalyst

Into a 100 ml round bottom flask, 21.2 mg of commercially available biscyclopentadienylzirconium dichloride was introduced, and the interior of the flask was flushed with nitrogen. Then, 10 ml of n-heptane was added thereto to obtain a slurry. Separately, 2.61 g of trimethylaluminum and 3.1 g of the aluminum-montmorilonite intercalation compound prepared in Example 17 (1) were taken, and 20 ml of n-heptane was added to each of them. While vigorously stirring the biscyclopentadienylzirconium dichloride slurry, the trimethylaluminum solution was dropwise added thereto at room temperature, and then the slurry of the aluminum-montmorillonite intercalation compound was dropwise added thereto. Heat was generated accompanied by generation of gas. After completion of the dropwise addition, stirring was continued for two hours to obtain a gray catalyst slurry. The concentration of zirconium derived from the biscyclopentadienylzirconium dichloride in the slurry was 1.32 μmol/ml.

(3) Copolymerization of Ethylene and Propylene

Into a 2 l induction-stirring type autoclave flushed with purified nitrogen, 300 ml of n-hexane, 2.6 ml of a toluene solution of trimethylaluminum (10.18 mM) and 2.0 ml of the above catalyst slurry were sequentially introduced at room temperature under a nitrogen stream. Further, 600 ml of liquid propylene was introduced. The mixed solution was heated to 70° C. Then, ethylene was introduced so that the ethylene partial pressure would be 7.6 kgf/cm$^2$, and polymerization was conducted for one hour. Then, supply of ethylene was stopped, and ethanol was introduced to terminate the polymerization. Then, the content of the autoclave was cooled to 30° C., and the interior gas was purged. As a result, 54 g of an ethylene-propylene copolymer with Mw/Mn being 2.2 was obtained. The amount of the copolymer produced per gram of the zirconium derived from biscyclopentadienylzirconium chloride was $2.2 \times 10^5$ g. Further, the amount of the copolymer produced per gram of the aluminum derived from trimethylaluminum was 1,500 g.

EXAMPLE 18

(1) Preparation of a Catalyst

Into a 300 ml round bottom flask, 151 mg of commercially available biscyclopentadienylzirconium dichloride was introduced, and the interior of the flask was thoroughly flushed with nitrogen. Then, 10 ml of n-heptane was added thereto to obtain a slurry. Separately, 3.72 g of trimethylaluminum and 12.0 g of commercially available montmorillonite were taken, respectively, and 10 ml and 80 ml of n-heptane were added, respectively. While vigorously stirring the biscyclopentadienylzirconium dichloride slurry, the trimethylaluminum solution was dropwise added thereto at room temperature, and then the montmorillonite slurry was dropwise added. Heat was generated accompanied by generation of gas. After completion of the dropwise addition, stirring was continued for two hours to obtain a gray slurry. The zirconium concentration in the catalyst slurry was 4.9 μmol/ml.

Further, in a separate 300 ml round bottom flask, 57.5 ml of the above slurry was taken at room temperature in a nitrogen atmosphere, and 2.0 ml of a toluene solution of trimethylaluminum (1.40M) was added thereto. Then, ethylene gas was introduced into the system and prepolymerized at room temperature for 45 minutes. Then, the supernatant was removed, followed by washing with hexane. By this reaction, a solid catalyst containing 25.9 μmol of zirconium, 3.0 mM of aluminum and 3.4 g of polyethylene per gram of montmorillonite, was obtained.

(2) Polymerization of ethylene

Into a 2 l induction-stirring type autoclave thoroughly flushed with purified nitrogen, 150 g of dry sodium chloride, the above solid catalyst in an amount corresponding to 8.5 μmol of zirconium and 8.4 ml of a toluene solution of trimethylaluminum (10.10 mM) were introduced at room temperature under a nitrogen stream. The content of the autoclave was heated to 70° C. Then, ethylene was introduced so that the ethylene partial pressure would be 9 kgf/cm$^2$, and polymerization was conducted for 30 minutes. Then, the content of the autoclave was washed with water to remove sodium chloride, and then the polymer was washed with hexane. As a result, 318 g of powdery polyethylene having a bulk density of 0.46 g/cm$^3$ and Mw/Mn being 2.3 was obtained. The amount of the polyethylene produced per gram of zirconium was $4.1 \times 10^5$ g, and the amount of the polyethylene produced per gram of the aluminum derived from trimethylaluminum, was 11,000 g.

EXAMPLE 19

(1) Preparation of a catalyst

Into a 300 ml round bottom flask, 57.5 ml of the slurry obtained in the same manner as in Example 18 (1) was taken at room temperature under a nitrogen atmosphere. Then, ethylene gas was introduced into the system and prepolymerized at room temperature for 45 minutes. Then, the supernatant was removed, followed by washing with hexane. By this reaction, a solid catalyst containing 25.4 μmol of zirconium, 2.6 mM of aluminum and 2.4 g of polyethylene per gram of montmorillonite, was obtained.

(2) Polymerization of Ethylene

Using the catalyst prepared in Example 19 (1), polymerization was conducted in the same manner as in Example 18 (2) to obtain 184 g of powdery polyethylene having bulk density of 0.43 g/cm3 and Mw/Mn being 2.1. The amount of the polyethylene produced per gram of the zirconium was $2.4 \times 10^5$ g, and the amount of the polyethylene produced per gram of the aluminum derived from trimethylaluminum, was 7,800 g.

EXAMPLE 20

(1) Preparation of a Catalyst

Into a 300 ml round bottom flask, 60 ml of the slurry having a Zr concentration of 4.9 μmol/ml of Example 18 (1), was taken at room temperature under a nitrogen atmosphere. Then, ethylene gas was introduced into the system and prepolymerized at room temperature for 45 minutes to obtain a catalyst slurry.

(2) Polymerization of Ethylene

Into a 2 l induction-stirring type autoclave thoroughly flushed with purified nitrogen, 150 g of dry sodium chloride and 1.7 ml of the above catalyst slurry were introduced at room temperature under a nitrogen stream. The content of the autoclave was heated to 70° C. Then, ethylene was introduced so that the ethylene partial pressure would be 9 kgf/cm$^2$, and polymerization was conducted for one hour. Then, the content of the autoclave was washed with water to remove sodium chloride. Then, the polymer was washed with hexane. As a result, 191 g of powdery polyethylene having a bulk density of 0.43 g/cm$^3$ and Mw/Mn being 2.4 was obtained. The amount of the polyethylene produced per gram of the zirconium was $2.5 \times 10^5$ g, and the amount of the polyethylene produced per gram of the aluminum derived from trimethylaluminum, was 8,500 g.

EXAMPLE 21

(1) Polymerization of Ethylene

Into a 2 l induction-stirring type autoclave thoroughly flushed with purified nitrogen, 150 g of dry sodium chloride, 1.7 ml of the catalyst slurry having a Zr concentration of 4.9 μmol/ml of Example 18 (1) as it is without prepolymerization, and 8.4 ml of a toluene solution of trimethylaluminum (10.10 mM) were introduced at room temperature under a nitrogen stream. The content of the autoclave was heated to 70° C. Then, ethylene was introduced so that the ethylene partial pressure would be 9 kgf/cm$^2$, and the polymerization was conducted for 30 minutes. Then, the content of the autoclave was washed with water to remove sodium chloride. Then, the polymer was washed with hexane. As a result, 230 g of powdery polyethylene having a bulk density of 0.32 g/cm$^3$ and Mw/Mn being 2.3 was obtained. The amount of the polyethylene produced per gram of the zirconium was $3.0 \times 10^5$ g, and the amount of the polyethylene per gram of the aluminum derived from trimethylaluminum, was 9,300 g.

EXAMPLE 22

(1) Preparation of a Catalyst

A catalyst was prepared in the same manner as in Example 18 (1) except that the order of addition of the montmorillonite slurry and the trimethylaluminum was reversed.

(2) Polymerization of Ethylene

Using the catalyst prepared in Example 22 (1), polymerization was conducted in the same manner as in Example 18 (2), whereby 166 g of polyethylene having a bulk density of 0.44 g/cm$^3$ and Mw/Mn being 2.3 was obtained. The amount of the polyethylene produced per gram of the zirconium was $2.1 \times 10^5$ g, and the amount of the polyethylene produced per gram of the aluminum derived from trimethylaluminum, was 5,800 g.

EXAMPLE 23

(1) Preparation of a Solid Catalyst

Into a 300 ml round bottom flask, 18.1 g of commercially available montmorillonite was introduced, and the interior of the flask was thoroughly flushed with nitrogen. Then, 80 ml of n-heptane was added thereto to obtain a slurry. Separately, 6.25 g of trimethylaluminum was dissolved in 20 ml of n-heptane. While vigorously stirring the trimethylaluminum solution, the montmorillonite slurry was slowly dropwise added thereto at room temperature. Heat was generated accompanied by generation of gas. After completion of the dropwise addition, stirring was continued for two hours to obtain a gray slurry.

Further, into a separate 300 ml round bottom flask, 25 mg of biscyclopentadienylzirconium dichloride was introduced at room temperature under a nitrogen atmosphere and preliminarily contacted with 5.4 ml of a toluene solution of trimethylaluminum (0.159M) for 30 minutes. Further, 10.4 ml of the slurry prepared as described above was added thereto, and the mixture was stirred for 20 minutes. Then, ethylene gas was introduced into the system and prepolymerized at room temperature for 45 minutes. Then, the supernatant was removed, followed by washing with hexane. By this reaction, a solid catalyst containing 36.0 μmol of zirconium, 3.9 mM of aluminum and 3.2 g of polyethylene per gram of montmorillonite, was obtained.

(2) Polymerization of Ethylene

Using the catalyst prepared in Example 23 (1), polymerization was conducted in the same manner as in Example 18 (2), whereby 254 g of polyethylene having a bulk density of 0.42 g/cm$^3$ and Mw/Mn being 2.1 was obtained. The amount of the polyethylene produced per gram of the zirconium was $3.3 \times 10^5$ g, and the amount of the polyethylene produced per gram of the aluminum derived from trimethylaluminum, was 9,400 g.

EXAMPLE 24

(1) Preparation of Bis(Cyclopentadienyl)(Methyl)Zirconium(Tetraphenylborate) Tetrahydrofuran Complex of Component (A)

Into a 300 ml round bottom flask, 7.5 g of commercially available biscyclopentadienylzirconium dichloride was introduced, and the interior of the flask was thoroughly flushed with nitrogen. Then, 120 ml of ethyl ether was added thereto at −20° C. to obtain a slurry. To this slurry, 32 ml of a hexane solution of methyllithium (1.6M) was gradually added at -20° C, and the mixture was stirred at 0° C for 30 minutes. Then, the solvent was evaporated, and the remained solid was sublimed and purified under reduced pressure of $2 \times 10^{-4}$ mmHg at a temperature of from 60 to 80° C to obtain biscyclopentadienylzirconium dimetyl. Separately, an aqueous solution containing 3.40 g of silver nitrate and 6.84 g of sodium tetraphenyl borate were mixed to obtain silver tetraphenyl borate.

The biscyclopentadienylzirconium dimethyl prepared as described above, was dissolved in 10 ml of acetonitrile. To this solution, a slurry of 1.0 g of silver tetraphenyl borate in acetonitrile (10 ml) was added at 0° C, and the mixture was stirred for one hour. The obtained solution was separated from the solid and evaporated to dryness, followed by washing with cool acetonitrile. Then, the product was recrystallized from acetonitrile and dried under reduced pressure for 48 hours. The obtained solid was recrystallized three times from tetrahydrofuran to obtain the above-identified complex.

(2) Preparation of a Solid Catalyst

Into a 300 ml round bottom flask, 324 mg of the above complex was introduced, and the interior of the flask was thoroughly flushed with nitrogen. Then, 10 ml of n-heptane was added thereto to obtain a slurry. Separately, 3.72 g of trimethylaluminum and 12.0 g of commercially available montmorillonite were taken separately, and 10 ml and 80 ml of n-heptane were added, respectively. While vigorously stirring the complex slurry, the trimethylaluminum solution was dropwise added at room temperature, and then the montmorillonite slurry was dropwise added thereto. Heat was generated accompanied by generation of gas. After completion of the dropwise addition, stirring was continued for two hours to obtain a gray slurry. The zirconium concentration in the catalyst slurry was 4.9 μmol/ml.

Further, into a separate 300 ml round bottom flask, 57.5 ml of the above slurry was taken at room temperature under a nitrogen atmosphere, and 2.0 ml of a toluene solution of trimethylaluminum (1.40M) was added thereto. Then, ethylene gas was introduced into the system and prepolymerized at room temperature for 3 hours. Then, the supernatant was removed, followed by washing with hexane. By this reaction, a solid catalyst containing 24.6 μmol of zirconium, 3.3 mM of aluminum and 0.2 g of polyethylene per gram of montmorillonite, was obtained.

(3) Copolymerization of Ethylene and Propylene

Into a 2 l induction-stirring type autoclave thoroughly flushed with purified nitrogen, 150 g of dry sodium chloride, the above solid catalyst of Example 24 (2) in an amount corresponding to 8.5 μmol of zirconium, and 8.4 ml of a toluene solution of trimethylaluminum (10.10 mM) were introduced at room temperature under a nitrogen stream. Then, the autoclave was heated to 70° C., and a gas mixture of ethylene and propylene (propylene: 25 mol%) was introduced so that the gas mixture pressure would be 9 kgf/cm$^2$, and polymerization was conducted for 15 minutes. Then, supply of the gas mixture was stopped, and ethanol was introduced to terminate the polymerization. Then, the content of the autoclave was cooled to 30° C., and the interior gas was purged. The content was washed with water and further with hexane. As a result, 19 g of an ethylene-propylene copolymer having a bulk density of 0.40 g/cm$^3$ and Mw/Mn being 2.6, was obtained. The amount of the copolymer produced per gram of the zirconium was $2.5 \times 10^4$ g, and the amount of the copolymer produced per gram of the aluminum derived from trimethylaluminum, was 570 g.

(4) Copolymerization of Ethylene and Propylene

Polymerization was conducted in the same manner as in Example 24 (3) except that the catalyst slurry prepared in Example 24 (2) was used without the prepolymerization, whereby 11 g of an ethylene-propylene copolymer having a bulk density of 0.31 g/cm$^3$ and Mw/Mn being 2.8 was obtained. The amount of the copolymer produced per gram of the zirconium was $1.4 \times 10^4$ g, and the amount of the copolymer produced per gram of the aluminum derived from trimethylaluminum, was 440 g.

EXAMPLE 25

(1) Preparation of a Solid Catalyst

Into a 300 ml round bottom flask, 17.7 g of commercially available montmorillonite was introduced, and the interior of the flask was thoroughly flushed with nitrogen. Then, 80 ml of toluene was added thereto to obtain a slurry. Separately, 5.86 g of trimethylaluminum was dissolved in 20 ml of toluene. While vigorously stirring the trimethylaluminum solution, the montmorillonite slurry was gradually dropwise added thereto at room temperature. Heat was generated accompanied with generation of gas. After completion of the dropwise addition, stirring was continued for two hours to obtain a greenish gray slurry was obtained.

Further, into a separate 300 ml round bottom flask, 36.5 mg of ethylene bis(4,5,6,7-tetrahydroindenyl)zirconium dichloride was introduced at room temperature under a nitrogen atmosphere, and preliminarily contacted with 5.4 ml of a toluene solution of trimethylaluminum (0.159M) for 30 minutes, and 11.1 ml of the slurry prepared as described above, was further added. The mixture was stirred for 20 minutes. Then, propylene gas was introduced into the system and prepolymerized at room temperature for one hour. Then, the supernatant was removed, followed by washing with hexane. By this reaction, a solid catalyst containing 34.5 μmol of zirconium, 3.8 mM of aluminum and 3.6 g of polypropylene per gram of montmorillonite, was obtained.

(2) Polymerization of Propylene

Into a 2 l induction-stirring type autoclave thoroughly flushed with purified nitrogen, 150 g of dry sodium chloride, the above solid catalyst in an amount corresponding to 8.5 μmol of zirconium and 8.4 ml of a toluene solution of a trimethylaluminum (10.10 mM) were introduced at room temperature under a nitrogen stream. The content of the autoclave was heated to 70° C. Then, propylene was introduced so that the propylene partial pressure would be 7 kgf/cm$^2$, and polymerization was conducted for 30 minutes. Then, supply of propylene was stopped, and ethanol was introduced to terminate the polymerization. Then, the content of the autoclave was cooled to 30° C., and the interior gas was purged. The content was washed with water and further with hexane. As a result, 222 g of polypropylene having a bulk density of 0.46 g/cm$^3$ and Mw/Mn being 2.1 was obtained. The amount of the polypropylene produced per gram of the zirconium was $2.9 \times 10^5$ g, and the amount of the propylene produced per gram of the aluminum derived from trimethylaluminum, was 8,100 g. The boiling heptane insoluble content of the obtained polypropylene was 97%.

EXAMPLE 26

(1) Preparation of a Solid Catalyst

A solid catalyst was prepared in the same manner as in Example 25 (1) except that 37.0 mg of isopropylidene(cyclopentadienyl)(fluorenyl)zirconium dichloride was used instead of 36.5 mg of ethylene bis(4,5,6,7-tetrahydroindenyl)zirconium dichloride. By this reaction, a solid catalyst containing 35.0 μmol of zirconium, 3.9 mM of aluminum and 3.0 g of polypropylene per gram of montmorillonite, was obtained.

(2) Polymerization of Propylene

Polymerization was conducted in the same manner as in Example 25 (2) except that isopropylidene(cyclopentadienyl)(fluorenyl)zirconium dichloride was used instead of ethylene bis(4,5,6,7-tetrahydroindenyl)zirconium dichloride. As a result, 204 g of polypropylene having a bulk density of 0.45 g/cm$^3$ and Mw/Mn being 2.1 was obtained. The amount of the polypropylene produced per gram of the zirconium was $2.6 \times 10^5$ g, and the amount of the polypropylene produced per gram of the aluminum derived from trimethylaluminum, was 7,300 g. The rrrr by $^{13}$C-NMR of the obtained polymer was 90%.

EXAMPLE 27

(1) Preparation of a Catalyst

Into a 500 ml round bottom flask, 57.5 ml of a slurry prepared in the same manner as in Example 18 (1) was taken at room temperature under a nitrogen atmosphere, and 2.0 ml of a toluene solution of trimethylaluminum (1.40M) was added thereto. Then, ethylene gas was introduced into the system and prepolymerized at 40° C. for 4 hours. Then, the supernatant was removed, followed by washing with hexane. By this reaction, a solid catalyst containing 25.0 μmol of zirconium, 3.1 mM of aluminum and 26 g of polyethylene per gram of montmorillonite, was obtained.

(2) Polymerization of Ethylene

Using the catalyst prepared in Example 27 (1), polymerization was conducted in the same manner as in Example 18 (2), whereby 302 g of powdery polyethylene having a bulk density of 0.44 g/cm$^3$ was obtained. The amount of the polyethylene produced per gram of the zirconium was $3.9 \times 10^5$ g, and the amount of polyethylene produced per gram of the aluminum derived from trimethylaluminum, was 9,800 g.

EXAMPLE 28

(1) Preparation of a Catalyst

A gray slurry was prepared in the same manner as in Example 18 (1) except that 9.89 g of mica (MK-100, manufactured by Corp Chemical) with a pore volume of pores having radii of at least 20 Å as measured by a mercury injection method being 0.670 cc/g, was used instead of montmorillonite. The zirconium concentration in the catalyst slurry was 4.9 μmol/ml.

Further, into a separate 300 ml round bottom flask, 57.5 ml of the above slurry was taken at room temperature under a nitrogen atmosphere, and 2.0 ml of a toluene solution of trimethylaluminum (1.40M) was added thereto. Then, ethylene gas was introduced into the system and prepolymerized at 40° C. for one hour. Then, the supernatant was removed, followed by washing with hexane. By this reaction, a solid catalyst containing 27.1 μmol of zirconium, 2.8 mM of aluminum and 7.7 g of polyethylene per gram of mica, was obtained.

(2) Polymerization of Ethylene

Polymerization was conducted in the same manner as in Example 18 (2) except that the above solid catalyst was employed and the polymerization time was changed to one hour, whereby 104 g of powdery polyethylene having a bulk density of 0.46 g/cm$^3$ was obtained. The amount of the polyethylene produced per gram of the zirconium was $1.3 \times 10^5$ g, and the amount of the polyethylene produced per gram of the aluminum derived from trimethylaluminum, was 4,000 g.

EXAMPLE 29

(1) Preparation of a Catalyst

Into a 100 ml round bottom flask thoroughly flushed with nitrogen, a toluene solution containing 1.48 mg of commercially available biscyclopentadienylzirconium dichloride, was introduced, and 1.3 mM of trimethylaluminum was added thereto under stirring at room temperature.

Into a separate 100 ml round bottom flask, 0.55 g of magnesium silicate pentahydrate (manufactured by Wako Junyaku Kogyo K.K.) with a pore volume of pores having radii of at least 20 Å as measured by a mercury injection method being 0.803 cc/g, was introduced, and the interior of the flask was thoroughly flushed with nitrogen. Then, 45 ml of toluene was added thereto to obtain a slurry.

7.5 ml of this slurry was added to the above contacted product of biscyclopentadienylzirconium dichloride and trimethylaluminum, at room temperature. After completion of the addition, stirring was continued at room temperature for one hour to obtain a catalyst slurry.

(2) Copolymerization of Ethylene and Propylene

Into a 2 l induction-stirring type autoclave flushed with purified nitrogen, 300 ml of n-hexane, 24 μmol of trimethylaluminum and then the entire amount of the above catalyst slurry were introduced at room temperature under a nitrogen stream. Further, 600 ml of liquid propylene was introduced.

The mixed solution was heated to 70° C. Then, ethylene was introduced so that the ethylene partial pressure would be 7.6 kgf/cm$^2$, and polymerization was conducted for one hour. Then, supply of ethylene was stopped, and ethanol was introduced to terminate the polymerization to obtain 75.0 g of an ethylene-propylene copolymer. The amount of the copolymer produced per gram of the zirconium was $1.6 \times 10^5$ g, the amount of the copolymer produced per gram of the aluminum derived from trimethylaluminum, was $2.1 \times 10^3$ g, and the amount of the copolymer produced per gram of magnesium silicate was $1.1 \times 10^3$ g.

Further, the propylene content in the obtained polymer was 8.1 mol%.

COMPARATIVE EXAMPLE 4

(1) Preparation of a Catalyst

A catalyst solution was prepared in the same manner as in Example 29 (1) except that no magnesium silicate was employed.

(2) Copolymerization of Ethylene and Propylene

Polymerization was conducted in the same manner as in Example 29 (2) except that the catalyst prepared in Comparative Example 4 (1) was used as the catalyst. The obtained polymer was in a trace amount.

COMPARATIVE EXAMPLE 5

(1) Preparation of a Catalyst

Into a 100 ml round bottom flask thoroughly flushed with nitrogen, a toluene solution containing 0.72 mg of commercially available biscyclopentadienylzirconium dichloride was introduced, and a toluene solution containing 3.7 mM as aluminum atom of methylaluminoxane (molecular weight: 1,232, manufactured by TOSO-ACZO) was added thereto under stirring at room temperature. After completion of the addition, stirring was continued at room temperature for one hour to obtain a catalyst.

(2) Copolymerization of Ethylene and Propylene

Using the catalyst prepared in Comparative Example 5 (1), polymerization was conducted in the same manner as in Example 29 (2) except that no trimethylaluminum was employed, to obtain 8.3 g of an ethylene-propylene copolymer. The amount of the copolymer produced per gram of the zirconium was $3.7 \times 10^4$ g, and the amount of the copolymer produced per gram of the aluminum derived from methylaminoxane, was 83 g.

EXAMPLE 30

(1) Preparation of a Catalyst

A catalyst slurry was prepared in the same manner as in Example 29 (1) using 0.83 mg of biscyclopentadienylzirconium dichloride, 1.4 mM of trimethylaluminum, 0.55 g of calcium silicate (manufactured by Wako Junyaku Kogyo K.K.) with a pore volume of pores having radii of at least 20 Å as measured by a mercury injection method being 0.681 cc/g, 24 ml of toluene and 2.0 ml of a calcium silicate slurry.

(2) Copolymerization of Ethylene and Propylene

Polymerization was conducted in the same manner as in Example 29 (2) except that the catalyst prepared in Example 30 (1) was used as the catalyst, whereby 47.1 g of an ethylene-propylene copolymer was obtained. The amount of the copolymer produced per gram of the zirconium was $1.8 \times 10^5$ g, and the amount of the copolymer produced per gram of the aluminum derived from trimethylaluminum, was $1.2 \times 10^3$ g.

EXAMPLE 31

(1) Preparation of a Catalyst

Into a 300 ml round bottom flask, 50 ml of toluene was introduced, and 0.3 mM of trimethylaluminum was added thereto. Then, the entire amount of the catalyst slurry prepared in the same manner as in Example 29 (1) except that 1.65 g of magnesium silicate pentahydrate, was used, was added thereto. Then, ethylene was introduced under stirring and prepolymerized at room temperature for one hour. After completion of the reaction, the supernatant was removed, followed by washing with n-hexane. By this reaction, a solid catalyst slurry containing 40.9 μmol of zirconium, 5.4 mM of aluminum and 2.7 g of polyethylene per gram of magnesium silicate, was obtained.

(2) Copolymerization of Ethylene and Propylene

Polymerization was conducted in the same manner as in Example 29 (2) except that the catalyst prepared in Example 31 (1) was used as the catalyst, to obtain 99.2 g of an ethylene-propylene copolymer having a propylene content of 8.0 mol%. The amount of the copolymer produced per gram of the zirconium was $1.3 \times 10^5$ g, and the amount of the copolymer produced per gram of the aluminum was $3.3 \times 10^3$ g.

EXAMPLE 32

(1) Preparation of a Catalyst

A catalyst slurry was prepared in the same manner as in Example 29 (1) except that 2.16 mg of ethylene bis(4,5,6,7-tetrahydroindenyl)zirconium dichloride was used as component (A).

(2) Polymerization of Propylene

Into a 2 l induction-stirring type autoclave thoroughly flushed with purified nitrogen, 300 ml of toluene, 24 μmol of trimethylaluminum and then the catalyst slurry prepared in Example 32 (1) were introduced at room temperature under a nitrogen stream, and 600 ml of liquid propylene was further introduced.

The autoclave was heated to 70° C., and polymerization was conducted for 30 minutes. Then, the interior gas of the autoclave was purged to obtain 63.5 g of a propylene polymer. The amount of the polymer produced per gram of the zirconium was $1.4 \times 10^5$ g, the amount of the polymer produced per gram of the aluminum derived from trimethylaluminum, was $1.8 \times 10^3$ g. Further, the boiling heptane insoluble content (value after refluxing for three hours) showing the stereospecificity, was 96%.

EXAMPLE 33

(1) Preparation of a Catalyst

A catalyst slurry was prepared in the same manner as in Example 29 (1) except that 2.19 mg of isopropylidene(cyclopentadienyl)(fluorenyl)zirconium dichloride was used as component (A).

(2) Polymerization of Propylene

Polymerization was conducted in the same manner as in Example 32 (2) except that the catalyst prepared in Example 33 (1) was used as the catalyst, whereby 67.2 g of a propylene polymer was obtained. The amount of the polymer produced per gram of the zirconium was $1.4 \times 10^5$ g, the amount of the polymer produced per gram of the aluminum derived from trimethylaluminum, was $1.9 \times 10^3$ g. Further, the syndiotactic.pentad of the obtained polymer was measured by $^{13}$C-NMR and was found to be 91%.

COMPARATIVE EXAMPLE 6

(1) Preparation of a Catalyst

A catalyst slurry was prepared in the same manner as in Example 29 (1) using 0.73 mg of bis(cyclopentadienyl)zirconium dichloride, 1.3 mM of trimethylaluminum, 1.30 g of silica (Fuji Davison 952, water content: 14.5 wt%), 42 ml of toluene and 5.0 ml of a silica slurry.

(2) Copolymerization of Ethylene and Propylene

Polymerization was conducted in the same manner as in Example 29 (2) except that a catalyst prepared in Comparative Example 6 (1) was used as the catalyst, whereby 16.5 g of an ethylene-propylene copolymer was obtained.

The amount of the copolymer produced per gram of the zirconium was $7.2 \times 10^4$ g. Further, the amount of the copolymer per gram of the aluminum derived from trimethylaluminum, was $4.8 \times 10^2$ g.

EXAMPLE 34

(1) Preparation of a Catalyst

Into a 300 ml round bottom flask, 15.1 mg of commercially available biscyclopentadienylzirconium dichloride was introduced, and the interior of the flask was thoroughly flushed with nitrogen. Then, 50 ml of n-heptane was added thereto to obtain a slurry. Separately, 1.86 g of trimethylaluminum and 4.86 g of commercially available diatomaceous earth (Kunilite 401, Kunimine Kogyo K.K.; same applies hereinafter) were taken, respectively, and 10 ml and 40 ml of n-heptane were added, respectively. While vigorously stirring the biscyclopentadienylzirconium dichloride slurry, the trimethylaluminum solution was dropwise added thereto at room temperature, and then the diatomaceous slurry was dropwise added. Heat was generated accompanied by generation of gas. After completion of the dropwise addition, stirring was continued for two hours to obtain a gray slurry. The zirconium concentration in the catalyst slurry was 0.47 μmol/ml.

(2) Polymerization of Ethylene

Into a 2 l induction-stirring type autoclave flushed with nitrogen, 500 ml of n-hexane, 1.9 ml of a toluene solution of trimethylaluminum (10.18 mM) and 5.1 ml of the above catalyst slurry were sequentially introduced at room temperature under a nitrogen stream. The mixed solution was heated to 70° C. Then, ethylene was introduced so that the ethylene partial pressure would be 9 kgf/cm$^2$, and polymerization was conducted for one hour. then, supply of ethylene was topped, and ethanol was introduced to terminate the polymerization. Then, the content of the autoclave was cooled to 30° C., and the interior gas was purged. As a result, 46 g of powdery polyethylene with Mw/Mn being 2.3 was obtained. The amount of the polymer produced per gram of the zirconium was $2.1 \times 10^5$ g, and the amount of the polymer produced per gram of the aluminum derived from trimethylaluminum, was 6,700 g.

(3) Copolymerization of Ethylene and Propylene

Into a 2 l induction-stirring type autoclave flushed with purified nitrogen, 300 ml of n-hexane, 1.9 ml of a toluene solution of trimethylaluminum (10.18 mM) and 5.1 ml of the above catalyst slurry were sequentially introduced at room temperature under a nitrogen stream. Further, 600 ml of liquid propylene was introduced. The mixed solution was heated to 70° C. Then, ethylene was introduced so that the ethylene partial pressure would be 7.6 kgf/cm$^2$, and polymerization was conducted for one hour. Then, supply of ethylene was stopped, and ethanol was introduced to terminate the polymerization. Then, the content of the autoclave was cooled to 30° C., and the interior gas was purged. As a result, 55 g of an ethylene-propylene copolymer with Mw/Mn being 2.2 was obtained. The amount of the copolymer produced per gram of the zirconium was $2.5 \times 10^5$ g. Further, the amount of the copolymer per gram of the aluminum derived from trimethylaluminum was 7,900 g.

EXAMPLE 35

(1) Preparation of a Catalyst

Into a 300 ml round bottom flask, 150 mg of commercially available biscyclopentadienylzirconium dichloride was introduced, and the interior of the flask was thoroughly flushed with nitrogen. Then, 10 ml of n-heptane was added thereto to obtain a slurry. Separately, 1.38 g of triethylaluminum and 9.6 g of commercially available diatomaceous earth were taken, respectively, and 10 ml and 80 ml of n-heptane were added, respectively. While vigorously stirring the biscyclopentadienylzirconium dichloride slurry, the trimethylaluminum solution was dropwise added at room temperature, and then the diatomaceous earth slurry was dropwise added thereto. Heat was generated accompanied by generation of gas. After completion of the dropwise addition, stirring was continued for two hours to obtain a gray slurry. The zirconium concentration in the catalyst slurry was 4.7 μmol/ml.

Into a 300 ml round bottom flask, 60 ml of the above slurry was taken at room temperature under a nitrogen atmosphere, and 2.0 ml of a toluene solution of trimethylaluminum (1.40M) was added thereto. Then, ethylene gas was introduced into the system and prepolymerized at room temperature for one hour. Then, the supernatant was removed, followed by washing with hexane. By this reaction, a solid catalyst containing 34.7 μmol of zirconium, 3.8 mM of aluminum and 1.1 g of polyethylene per 1 g of diatomaceous earth, was obtained.

(2) Polymerization of Ethylene

Into a 2 l induction-stirring type autoclave thoroughly flushed with purified nitrogen, 150 g of dry sodium chloride, the above solid catalyst in an amount corresponding to 8.5 μmol of zirconium and 8.4 ml of a toluene solution of trimethylaluminum (10.18 mM) were introduced at room temperature under a nitrogen stream. The content of the autoclave was heated to 70° C. Then, ethylene was introduced so that the ethylene partial pressure would be 9 kgf/cm$^2$, and polymerization was conducted for one hour. Then, the content of autoclave was washed with water to remove sodium chloride. Then, the polymer was washed with hexane. As a result, 149 g of powdery polyethylene having a bulk density of 0.45 g/cm$^3$ and Mw/Mn being 2.3 was obtained. The amount of the polyethylene produced per gram of the zirconium was $1.9 \times 10^5$ g, and the amount of the polyethylene produced per gram of the aluminum derived from trimethylaluminum, was 5,400 g.

EXAMPLE 36

(1) Preparation of a Catalyst

Into a 100 ml round bottom flask, 14.8 mg of commercially available bis(cyclopentadienyl)zirconium dichloride was introduced, and the interior of the flask was thoroughly flushed with nitrogen. Then, 10 ml of n-heptane was added thereto to obtain a slurry. Separately, 1.83 g of trimethylaluminum and 3.18 g of zeolite (Zeolite Beta, manufactured by PQ Corporation; same applies hereinafter) were taken, respectively, and 20 ml of n-heptane was added to each of them. While vigorously stirring the bis(cyclopentadienyl)zirconium dichloride, the trimethylaluminum solution was dropwise added thereto at room temperature, and then the zeolite slurry was dropwise added thereto. Heat was generated accompanied by generation of gas. After completion of the dropwise addition, stirring was continued for two hours to obtain a gray slurry. The zirconium concentration in the catalyst slurry was 1.01 μmol/ml.

(2) Polymerization of Ethylene

Polymerization was conducted in the same manner as in Example 34 (2) except that the amount of the toluene solution of trimethylaluminum was changed to 1.8 ml and the amount of the catalyst slurry introduced, was changed to 1.8 ml, whereby 91 g of powdery polyethylene with Mw/Mn being 2.3 was obtained. The amount of the polymer produced per gram of the zirconium was $5.5 \times 10^5$ g. Further, the amount of the polymer produced per gram of the aluminum derived from trimethyl aluminum, was 3,600 g.

(3) Copolymerization of Ethylene and Propylene

Copolymerization was conducted in the same manner as in Example 34 (3) except that the amount of the toluene solution of trimethylaluminium was changed to 1.8 ml and the amount of the above catalyst slurry introduced, was changed to 1.8 ml, whereby 130 g of an ethylene-propylene copolymer with Mw/Mn being 2.2 was obtained. The amount of the copolymer produced per gram of the zirconium was $7.8 \times 10^5$ g. Further, the amount of the copolymer produced per gram of the aluminum derived from trimethylaluminum, was 5,200 g.

EXAMPLE 37

(1) Preparation of a Catalyst

Into a 100 ml round bottom flask, 50 mg of commercially available bis(cyclopentadienyl)zirconium dichloride was introduced, and the interior of the flask was thoroughly flushed with nitrogen. Then, 10 ml of n-heptane was added thereto to obtain a slurry. Separately, 1.25 g of trimethylaluminum and 2.31 g of zeolite were taken, respectively, and 20 ml of n-heptane was added to each of them. While vigorously stirring the bis(cyclopentadienyl)zircondium dichloride slurry, the trimethylaluminum solution was dropwise added thereto at room temperature, and then the zeolite slurry was dropwise added thereto. Heat was generated accompanied by generation of thus. After completion of the dropwise addition, stirring was continued for two hours to obtain a gray slurry. The zirconium concentration in the catalyst slurry was 3.4 μmol/ml.

Into 100 ml round bottom flask, 40 ml of the above slurry was taken at room temperature under a nitrogen atmosphere, and 1.0 ml of a toluene solution of trimethylaluminum (1.40M) was added thereto. Then, ethylene gas was introduced into the system and prepolymerized at room temperature for 3 hours. Then, the supernatant was removed, followed by washing with hexane. By this reaction, a solid catalyst containing 45.9 μmol of zirconium, 5.9 mM of aluminum and 2.4 g of polyethylene per gram of zeolite, was obtained.

(2) Polymerization of Ethylene

Polymerization was conducted in the same manner as in Example 35 (2) except that the above solid catalyst was employed, whereby 79 g of powdery polyethylene having a bulk density of 0.44 g/cm³ was obtained. The amount of the polyethylene produced per gram of the zirconium was $1.0 \times 10^5$ g, and the amount of the polyethylene produced per gram of the aluminum derived from trimethylaluminum, was 2,500 g.

We claim:

1. A catalyst for polymerizing an olefin which consists essentially of a product obtained by contacting (A) a metallocene transition metal compound, (B) at least one member selected from the group consisting of ion exchanging layered compounds other than silicates and inorganic silicates, and (C) an organic aluminum compound of the formula $AlR^6_j X_{3-j}$ wherein $R_6$ is a $C_{1-20}$ hydrocarbon group, X is hydrogen, halogen or an alkoxy group, and j is a number satisfying $0 < j \leq 3$.

2. The catalyst according to claim 1, wherein component (B) is an ion exchanging layered compound.

3. The catalyst according to claim 1, wherein component (B) is clay.

4. The catalyst according to claim 1, wherein component (B) is montmorillonite.

5. The catalyst according to claim 1, wherein component (B) is diatomaceous earth.

6. The catalyst according to claim 1, wherein component (B) is a zeolite.

7. The catalyst according to claim 1, wherein the pore volume of pores having radii of at least 20 Å of component (B) is at least 0.1 cc/g as measured by a mercury injection method.

8. The catalyst according to claim 7, wherein the pore volume is within a range of from 0.3 to 5 cc/g.

9. The catalyst according to claim 1, wherein the metallocene transition metal compound of component (A) is an organometallic compound composed of a cyclopentadienyl ring-containing ligand and a metal of Group 4, 5 or 6 of the long-form Periodic Table.

10. The catalyst according to claim 1, wherein component (A) is a compound of the formula (1) or (2):

  (1)

  (2)

wherein each of $(CpR^2_n)$ which may be the same or different, is a cyclopentadienyl group or a substituted cyclopentadienyl group, $R^1$ is a covalent bond crosslinking group containing an element of Group 14 of the long-form Periodic Table, each of $R^2$ which may be the same or different, is hydrogen, halogen, a silicon-containing group, a $C_{1-20}$ hydrocarbon group which may have a halogen substituent, an alkoxy group or an aryloxy group, provided that when two $R^2$ are located on two adjacent carbon atoms on the cyclopentadienyl group, they may bond to each other to form a $C_{4-6}$ ring, each of $R^3$ which may be the same or different, is hydrogen, halogen, a silicon-containing group, a $C_{1-20}$ hydrocarbon group which may have a halogen substituent, an alkoxy group or an aryloxy group, m is 0 or 1, each n is an integer satisfying $m+n=5$, M is a metal of Group 4, 5 or 6 of the long-form Periodic Table, $R^4$ is a neutral ligand coordinated to M, and $R^5$ is a counter anion capable of stabilizing said metal.

11. The catalyst according to claim 10, wherein the cyclopentadienyl group or the substituted cyclopentadienyl group of the formula $CpR^2_n$ in the formulas (1) and (2) is a substituted cyclopentadienyl group, an indenyl group, a tetrahydroindenyl group, a fluorenyl group or an octahydrofluorenyl group.

12. The catalyst according to claim 10, wherein $R^1$ in the formulas (1) and (2) is an alkylene group, an alkylidene group or a silicon-containing crosslinking group.

13. The catalyst according to claim 10, wherein M in the formulas (1) and (2) is titanium, zirconium or hafnium.

14. The catalyst according to claim 1, wherein the organic aluminum compound is a trialkylaluminum.

15. The catalyst according to claim 1, wherein the weight ratio of the transition metal in component (A) to the aluminum in component (C), per gram of component (B), is 0.00001-1 (g): 0.001-100 (g).

16. A solid catalyst for polymerizing an olefin, which is formed by prepolymerizing an olefin in an amount of from 0.001 to 1,000 g per gram of component (B) by a product obtained as defined by claim 1.

17. The solid catalyst according to claim 16, wherein the temperature of prepolymerization is within a range of from $-50°$ to $+100°$ C.

18. The solid catalyst according to claim 16, wherein the amount of the olefin polymer formed by the prepolymerization is from 0.01 to 300 g per gram of component (B).

19. The catalyst according to claim 1, wherein component (B) is a clay mineral.

20. The catalyst according to claim 1, wherein component (B) is an inorganic silicate.

21. The catalyst according to claim 1, wherein the metallocene transition metal compound is composed of at least one cyclopentadienyl ligand which may be substituted, wherein the substituents may bond to form a ring, and a transition metal of Group 4, 5 or 6 of the long-form Periodic Table.

* * * * *

UNITED STATES PATENT AND TRADEMARK OFFICE
CERTIFICATE OF CORRECTION

PATENT NO. : 5,308,811

DATED : MAY 3, 1994

INVENTOR(S) : YOSHINORI SUGA ET AL

It is certified that error appears in the above-identified patent and that said Letters Patent is hereby corrected as shown below:

Column 38, line 8, $"^+R^{5-}"$ should read -- $[R^1m(CpR^2n)(CpR^2n)MR^3R^4]^+R^{5-}$ --.

Signed and Sealed this

Twenty-first Day of March, 1995

Attest:

BRUCE LEHMAN

Attesting Officer

Commissioner of Patents and Trademarks